US012397783B2

(12) United States Patent
Miyazaki et al.

(10) Patent No.: US 12,397,783 B2
(45) Date of Patent: Aug. 26, 2025

(54) CONTROL DEVICE FOR DRIVING ASSISTANCE DEVICE

(71) Applicant: Hitachi Astemo, Ltd., Hitachinaka (JP)

(72) Inventors: Akitoshi Miyazaki, Tokyo (JP); Masashi Seimiya, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 289 days.

(21) Appl. No.: 18/010,279

(22) PCT Filed: Mar. 18, 2021

(86) PCT No.: PCT/JP2021/011104
§ 371 (c)(1),
(2) Date: Dec. 14, 2022

(87) PCT Pub. No.: WO2021/261034
PCT Pub. Date: Dec. 30, 2021

(65) Prior Publication Data
US 2023/0242103 A1    Aug. 3, 2023

(30) Foreign Application Priority Data
Jun. 26, 2020    (JP) ................. 2020-110288

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/06* (2013.01);
(Continued)

(58) Field of Classification Search
None
See application file for complete search history.

(56) References Cited

U.S. PATENT DOCUMENTS

2014/0324310 A1* 10/2014 Kobayashi ........... B62D 15/027
701/70
2017/0203757 A1    7/2017 Ohbayashi et al.
(Continued)

FOREIGN PATENT DOCUMENTS

JP    2012-025378 A    2/2012
JP    2017-128213 A    7/2017
(Continued)

OTHER PUBLICATIONS

English translation of JP-2018030580-A (wherein the paragraph numbering provided coincides with any relevant citations to this reference within the accompanying Office Action) (Year: 2018).*
(Continued)

*Primary Examiner* — Thomas E Worden
*Assistant Examiner* — Bryant Tang
(74) *Attorney, Agent, or Firm* — Foley & Lardner LLP

(57) ABSTRACT

An object of the present invention is to improve convenience of parking assistance. A control device 111 of a driving assistance device 200 controls an emergency brake device that actuates an emergency brake based on a distance to an obstacle detected by a sonar 3 constituting the detection device mounted on a vehicle 1 and a parking assistance device that provides parking assistance for the vehicle 1. In the sonar 3 constituting the detection device, an upper limit value and a lower limit value that define a range of the distance in which an obstacle can be detected are determined in advance. The control device 111 invalidates the operation of the emergency brake device when the distance between the vehicle 1 and the obstacle at a target vehicle stop position which is a target position for stopping the vehicle 1 in the parking assistance is smaller than the lower limit value.

9 Claims, 12 Drawing Sheets

(51) Int. Cl.
  *B60W 30/06*  (2006.01)
  *B60W 30/095*  (2012.01)
  *B60W 40/02*  (2006.01)

(52) U.S. Cl.
  CPC ........ *B60W 30/0956* (2013.01); *B60W 40/02* (2013.01); *B60W 2420/54* (2013.01); *B60W 2554/20* (2020.02); *B60W 2554/40* (2020.02); *B60W 2554/80* (2020.02); *B60W 2555/20* (2020.02); *B60W 2556/20* (2020.02); *B60W 2710/18* (2013.01)

(56) References Cited

U.S. PATENT DOCUMENTS

2021/0291834 A1* 9/2021 Morita .................. B60W 10/04
2022/0227396 A1* 7/2022 Tsuchida ........... B60W 60/0027

FOREIGN PATENT DOCUMENTS

JP    2018-30580 A    3/2018
JP    2018030580 A  * 3/2018

OTHER PUBLICATIONS

International Search Report and Written Opinion in International Application No. PCT/JP2021/011104 dated Jun. 8, 2021.

\* cited by examiner

CONTROL DEVICE FOR DRIVING ASSISTANCE DEVICE

TECHNICAL FIELD

The present invention relates to a control device of a driving assistance device.

BACKGROUND ART

A driving assistance device including both a parking assistance device that assists a driving operation from a parking assistance start position to a parking position and an emergency brake device that actuates a brake when a distance to an obstacle detected by the detection device becomes equal to or less than a predetermined distance is known.

PTL 1 describes a driving assistance device that shortens a distance to an obstacle that operates an emergency brake device when parking assistance is being performed and a vehicle speed is equal to or less than a predetermined speed.

CITATION LIST

Patent Literature

PTL 1: JP 2018-30580 A

SUMMARY OF INVENTION

Technical Problem

During parking assistance, steering wheel turn-back to stop for switching between forward travel and backward travel may be performed. In a case where there is an obstacle several tens of centimeters ahead of the position where the steering wheel turn-back is performed, there is a possibility that the emergency brake device of the driving assistance device described in PTL 1 operates before reaching the position where the steering wheel turn-back is performed. In the driving assistance device described in PTL 1, parking assistance is interrupted before reaching a position where steering wheel turn-back is performed, or the number of times of steering wheel turn-back performed until reaching a target parking position increases. The driving assistance device described in PTL 1 has room for improvement in terms of improving the convenience of parking assistance.

The present invention has been made in view of the above, and an object thereof is to improve convenience of parking assistance.

Solution to Problem

In order to solve the above problem, a control device of a driving assistance device according to the present invention is a control device of a driving assistance device that controls an emergency brake device that performs emergency braking based on a distance to an obstacle detected by a detection device mounted on a vehicle and a parking assistance device that performs parking assistance of the vehicle. An upper limit value and a lower limit value that define a range of the distance in which the obstacle can be detected are determined in advance in the detection device. The control device invalidates an operation of the emergency brake device when the distance between the vehicle at a target vehicle stop position and the obstacle located ahead in a traveling direction of the vehicle traveling toward the target vehicle stop position in the parking assistance is smaller than the lower limit value.

Advantageous Effects of Invention

According to the present invention, it is possible to improve convenience of parking assistance.

Objects, configurations, and effects besides the above description will be apparent through the explanation on the following embodiments.

DESCRIPTION OF EMBODIMENTS

Figure 1:
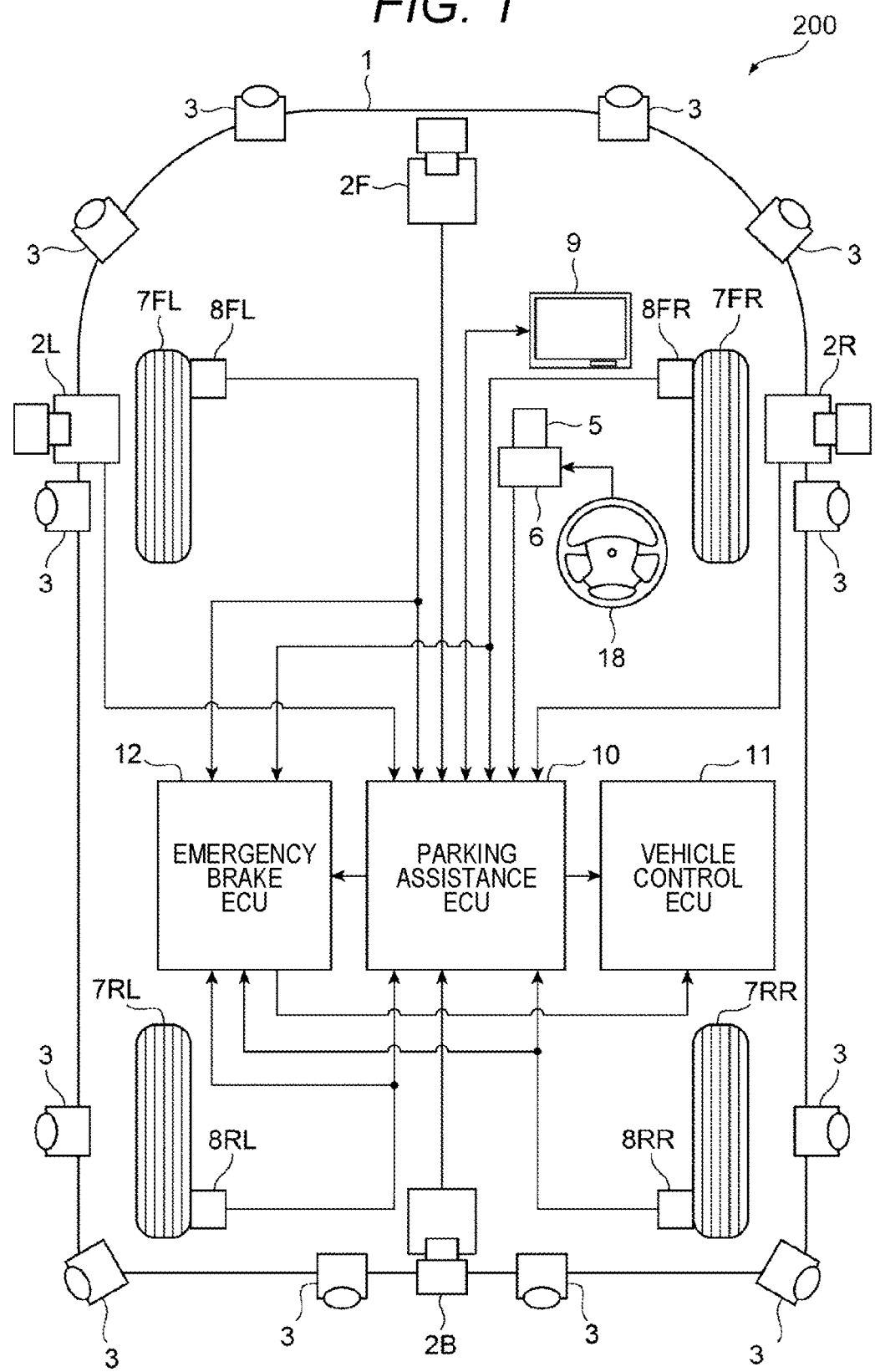
FIG. 1 is a diagram illustrating a configuration of a driving assistance device according to a first embodiment.

Hereinafter, embodiments of the present invention will be described using the drawings. Configurations denoted by the same reference numerals in the respective embodiments have similar functions in the respective embodiments unless otherwise specified, and thus the description thereof will be omitted.

First Embodiment

FIG. 1 is a diagram illustrating a configuration of a driving assistance device 200 according to a first embodiment.

The driving assistance device 200 is a driving assistance device that is mounted on a vehicle 1 and has both parking assistance and emergency braking functions. The driving assistance device 200 includes a front camera 2F, a right camera 2R, a rear camera 2B, a left camera 2L, a sonar 3, a right front wheel speed sensor 8FR, a right rear wheel speed sensor 8RR, a left rear wheel speed sensor BRL, and a left front wheel speed sensor 8FL. The driving assistance device 200 further includes an electric power steering (EPS) device 6, an in-vehicle display device 9, a parking assistance electronic control unit (ECU) 10, a vehicle control ECU 11, and an emergency brake ECU 12.

The front camera 2F is a camera that is mounted on the front of the vehicle 1 and images the front side of the vehicle 1. The right camera 2R is a camera that is mounted on the right of the vehicle 1 and captures an image of the right side of the vehicle 1. The rear camera 2B is a camera that is mounted on the rear of the vehicle 1 and images the rear side of the vehicle 1. The left camera 2L is a camera that is mounted on the left of the vehicle 1 and captures an image of the left side of the vehicle 1. In the present embodiment, the front camera 2F, the right camera 2R, the rear camera 2B, and the left camera 2L are also collectively referred to as "camera 2". The camera 2 includes a lens and an imaging element. The camera 2 may include a monocular camera or a stereo camera. The camera 2 is arranged at an appropriate position where the surrounding environment of the vehicle 1 can be comprehensively imaged. The image acquired by the camera 2 is output to the parking assistance ECU 10, and image processing is performed. The image acquired by the camera 2 may be output not only to the parking assistance ECU 10 but also to the emergency brake ECU 12, and the image processing may be performed by the emergency brake ECU 12.

The sonar 3 is a detection device that is mounted on the vehicle 1 and detects an obstacle present around the vehicle 1. A plurality of sonars 3 are mounted on the front, the right, the rear, and the left of the vehicle 1. Each of the plurality of sonars 3 transmits an ultrasonic wave and receives a reflected wave from an obstacle around the vehicle 1, thereby detecting the presence or absence of the obstacle. The time from the transmission of the ultrasonic wave to the reception of the reflected wave can be converted into a distance from the vehicle 1 to the obstacle. That is, the distance from the vehicle 1 to the obstacle is calculated based on the detection result of the sonar 3. Signals indicating the detection result of the sonar 3 are output to the parking assistance ECU 10 and the emergency brake ECU 12, and are stored as obstacle detection information. FIG. 1 does not illustrate a connection relationship between the sonar 3 and the parking assistance ECU 10 and the emergency brake ECU 12. The sonar 3 constitutes a detection device described in the claims.

The distance from the vehicle 1 to the obstacle is calculated based on the detection result of the sonar 3. In the sonar 3, the range of the distance in which the obstacle can be detected is determined in advance by the specification of the sonar 3 or the like. The range of the distance in which the obstacle can be detected is defined by the upper limit value and the lower limit value of the distance in which the obstacle can be detected. That is, in the sonar 3, an upper limit value and a lower limit value that define the range of the distance in which the obstacle can be detected are determined in advance. In the present embodiment, the range of the distance in which the sonar 3 can detect the obstacle is also referred to as a "detectable range". The detectable range is a range of distances in which the distance between the vehicle 1 and the obstacle can be accurately calculated. In the present embodiment, the lower limit value that defines the detectable range is also referred to as a "lower limit value of the detectable range".

The right front wheel speed sensor 8FR is a sensor that is provided on a right front wheel 7FR, which is a wheel on a right front portion of a vehicle body of the vehicle 1, and detects the wheel speed of the wheel. The right rear wheel speed sensor 8RR is a sensor that is provided on a right rear wheel 7RR, which is a wheel on a right rear portion of the vehicle body of the vehicle 1, and detects the wheel speed of the wheel. The left rear wheel speed sensor 8RL is a sensor that is provided on a left rear wheel 7RL which is a wheel on a left rear portion of the vehicle body of the vehicle 1 and detects the wheel speed of the wheel. The left front wheel speed sensor 8FL is a sensor that is provided on a left front wheel 7FL, which is a wheel on a left front portion of the vehicle body of the vehicle 1, and detects the wheel speed of the wheel. In the present embodiment, the right front wheel 7FR, the right rear wheel 7RR, the left rear wheel 7RL, and the left front wheel 7FL are also collectively referred to as "wheel 7". In the present embodiment, the right front wheel speed sensor 8FR, the right rear wheel speed sensor 8RR, the left rear wheel speed sensor 8RL, and the left front wheel speed sensor 8FL are also collectively referred to as "wheel speed sensor 8". A signal indicating the detection result of the wheel speed sensor 8 is output to the parking assistance ECU 10 and the emergency brake ECU 12, and is used for estimation of the own vehicle position of the vehicle 1 and calculation of the speed of the vehicle 1.

The EPS device 6 changes the direction of the wheels 7 according to the operation amount (steering angle) of a steering wheel 18 provided in the cab of the vehicle 1. The EPS device 6 includes, for example, a steering angle sensor 5 that detects a steering angle of the steering wheel 18, a motor that assists steering torque that is torque for changing the direction of each wheel 7, and an ECU that controls the steering torque. The EPS device 6 changes the orientation of the wheels 7 by controlling the steering torque so as to assist the driver's operation of the steering wheel 18. A signal indicating the detection result of the steering angle sensor 5 is output to the parking assistance ECU 10 and used for calculation of the traveling direction of the vehicle 1.

The in-vehicle display device 9 is provided in the cab of the vehicle 1 and presents various types of information to the driver. For example, the in-vehicle display device 9 presents an image captured by the camera 2 and processed by the parking assistance ECU 10 to the driver. In particular, as will be described later, the in-vehicle display device 9 presents a candidate for a target parking position, which is a candidate for a location where parking is possible, to the driver. The target parking position is a target position at which the vehicle 1 is parked in the parking assistance. The in-vehicle display device 9 is constituted by a pressure-sensitive or electrostatic touch screen in which a display and an input device are integrated, and may be provided as a part of a car navigation system or may be constituted by a head-up display. In addition, the in-vehicle display device 9 may include an information input device such as a keyboard, a voice instruction device, and a switch. The in-vehicle display device 9 can output the input contents to the parking assistance ECU 10 when the driver performs an input operation.

The emergency brake ECU 12 is an electronic control unit that performs emergency braking based on the distance to the obstacle detected by the sonar 3 constituting the detection device. The emergency brake ECU 12 performs emergency braking when the distance from the vehicle 1 to the obstacle becomes equal to or less than a threshold. Specifically, the emergency brake ECU 12 estimates the own vehicle position of the vehicle 1 and calculates the speed of the vehicle 1 by dead reckoning using the detection result of the wheel speed sensor 8. The emergency brake ECU 12 calculates the distance from the vehicle 1 to the obstacle based on the detection result of the sonar 3. The emergency brake ECU 12 calculates a braking force value necessary for stopping without colliding with an obstacle, and outputs a signal including the calculated braking force value to the vehicle control ECU 11.

The parking assistance ECU 10 is an electronic control unit that performs parking assistance of the vehicle 1.

Specifically, the parking assistance ECU 10 creates candidates for the target parking position and creates information on surrounding obstacles on the basis of the information acquired by the camera 2 and the sonar 3. The parking assistance ECU 10 outputs the candidate for the target parking position to the in-vehicle display device 9, superimposes and displays the candidate on an image around the vehicle 1, and presents the candidate for the target parking position to the driver. When there is a plurality of candidates for the target parking position presented on the in-vehicle display device 9 while the vehicle 1 is stopped, the driver can select the target parking position from the plurality of candidates.

The parking assistance ECU 10 creates a travel route of the vehicle 1 in the parking assistance, that is, a route from the own vehicle position of the vehicle 1 to the target parking position based on the selected target parking position and information on surrounding obstacles. The parking assistance ECU 10 creates information necessary for causing the vehicle 1 to travel according to the created route, and outputs a signal indicating the information to the vehicle control ECU 11. The route is created based on the certainty of the obstacle information acquired by the sensor included in the vehicle 1. The parking assistance ECU 10 can create a safe route that does not collide with an obstacle and an efficient route that does not unnecessarily leave a distance from the obstacle. As a result, the driving assistance device 200 can perform parking assistance that makes the driver feel that the behavior of the vehicle 1 is a natural behavior.

The vehicle control ECU 11 is an electronic control unit that controls a traveling device of the vehicle 1 such as an accelerator and a brake. For example, the vehicle control ECU 11 includes at least a motor ECU 11A that controls a motor that drives the vehicle 1, a brake ECU 11B that controls a brake of the vehicle 1, and an EPS ECU 11C that controls the EPS device 6 (see FIG. 4).

The vehicle control ECU 11 controls the traveling device of the vehicle 1 based on signals output from the parking assistance ECU 10 and the emergency brake ECU 12. Specifically, the vehicle control ECU 11 controls the brake of the vehicle 1 based on the signal including the braking force value output from the emergency brake ECU 12. The vehicle control ECU 11 supports at least one of a steering operation, an accelerator operation, a brake operation, and a shift operation of the driver by controlling the traveling device of the vehicle 1 on the basis of a signal output from the parking assistance ECU 10. For example, the vehicle control ECU supports the steering operation of the driver by autonomously operating the EPS device 6 based on a signal including a steering angle output from the parking assistance ECU 10. For example, the vehicle control ECU 11 supports the driver's accelerator operation and brake operation by autonomously operating the drive motor and the brake based on a signal including the driving force value and the braking force value output from the parking assistance ECU 10. For example, the vehicle control ECU 11 supports a shift operation of the driver by autonomously operating a shift-by-wire control device that controls a shift range of the automatic transmission on the basis of a signal for changing the shift-by-wire control device to a drive range, a reverse range, or a parking range. As a result, when the driver performs a driving operation necessary for parking, the driving assistance device 200 can assist a part or all of the operation.

In the present embodiment, the camera 2, the sonar 3, the EPS device 6, the wheel speed sensor 8, the in-vehicle display device 9, the parking assistance ECU 10, and the vehicle control ECU 11 constitute a parking assistance device described in the claims. In the present embodiment, the sonar 3, the wheel speed sensor 8, the emergency brake ECU 12, and the vehicle control ECU 11 constitute an emergency brake device described in the claims. The emergency brake device according to the present embodiment will be described assuming that an obstacle is detected by the sonar 3 and the own vehicle position is estimated by dead reckoning using the detection result of the wheel speed sensor 8. The emergency brake device is not limited thereto, and may detect an obstacle by another sensor such as the camera 2 or the rider. Further, the emergency brake device may estimate the own vehicle position by performing dead reckoning using not only the detection result of the wheel speed sensor 8 but also the steering angle detected by the steering angle sensor 5. In the present embodiment, the parking assistance function and the emergency braking function are described as being mounted on different ECUs. However, the parking assistance function and the emergency braking function may be mounted on one ECU, or may be mounted on the vehicle control ECU 11.

Figure 2:
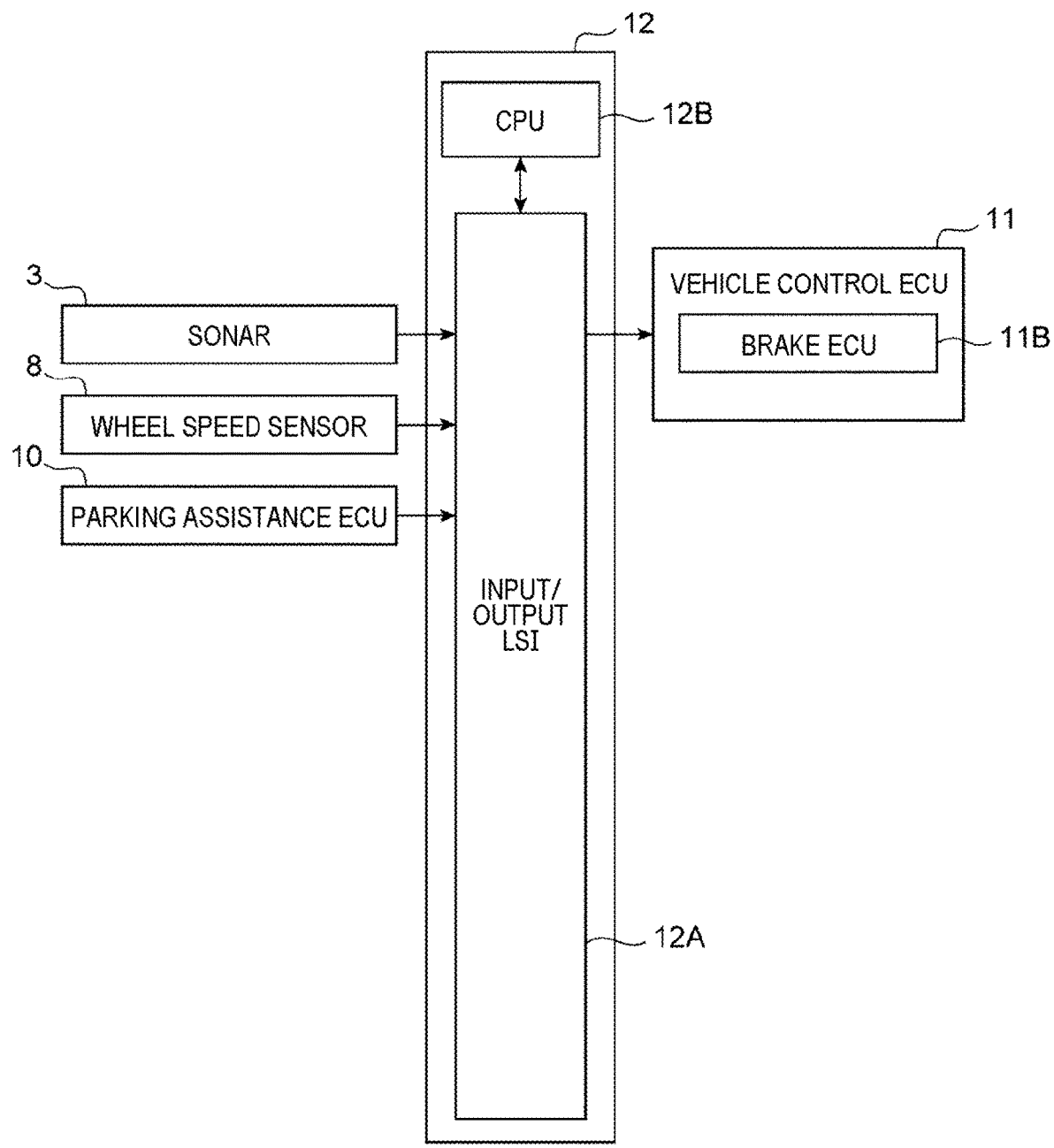
FIG. 2 is a diagram illustrating an internal configuration of an emergency brake ECU illustrated in FIG. 1.

FIG. 2 is a diagram illustrating an internal configuration of the emergency brake ECU 12 illustrated in FIG. 1. FIG. 2 illustrates an electrical connection relationship between the emergency brake ECU 12 and its peripheral devices.

The emergency brake ECU 12 includes an input/output large scale integration (LSI) 12A including an AD converter and a central processing unit (CPU) 12B. The sonar 3, the wheel speed sensor 8, and the parking assistance ECU 10 are connected to an input side of the emergency brake ECU 12. The brake ECU 11B of the vehicle control ECU 11 is connected to an output side of the emergency brake ECU 12.

Figure 3:
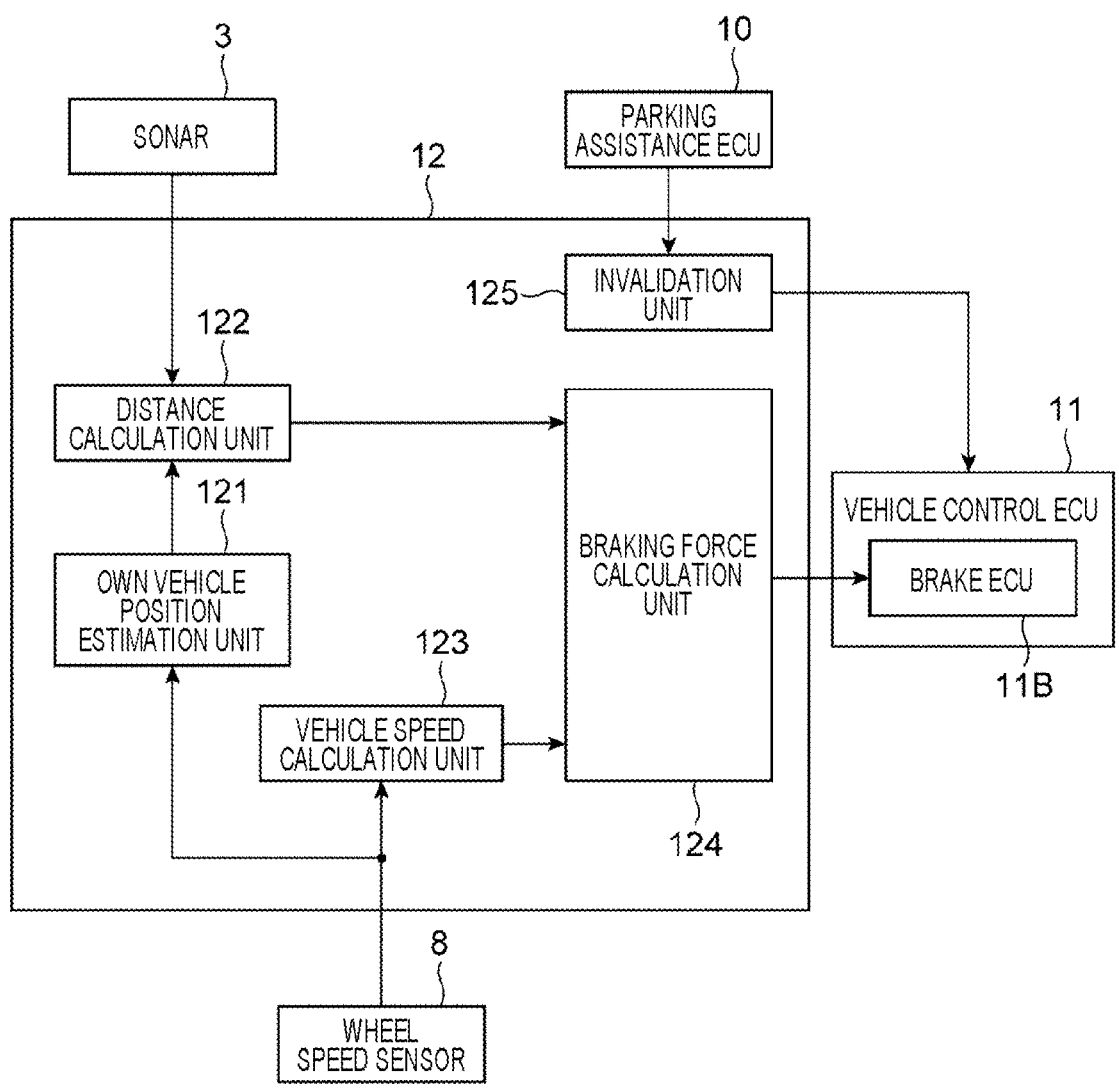
FIG. 3 is a diagram illustrating a functional configuration of an emergency brake ECU illustrated in FIG. 1.

FIG. 3 is a diagram illustrating a functional configuration of the emergency brake ECU 12 illustrated in FIG. 1. Each function illustrated in FIG. 3 is realized by hardware, software, or a combination thereof.

The emergency brake ECU 12 includes an own vehicle position estimation unit 121, a distance calculation unit 122, a vehicle speed calculation unit 123, a braking force calculation unit 124, and an invalidation unit 125.

The own vehicle position estimation unit 121 estimates the current own vehicle position of the vehicle 1 by dead reckoning using the detection result of the wheel speed sensor 8. The distance calculation unit 122 calculates the distance from the vehicle 1 to the obstacle based on the detection result of the sonar 3. The vehicle speed calculation unit 123 calculates the current vehicle speed of the vehicle 1 based on the detection result of the wheel speed sensor 8. The braking force calculation unit 124 calculates a braking force value necessary for stopping without colliding with the obstacle based on the distance to the obstacle calculated by the distance calculation unit 122 and the vehicle speed calculated by the vehicle speed calculation unit 123. The braking force calculation unit 124 outputs a signal including the calculated braking force value to the brake ECU 11B of the vehicle control ECU 11. The invalidation unit 125 creates a signal indicating that the operation of the brake by the emergency braking function is temporarily invalidated based on a signal output from the control device 111 to be described later of the parking assistance ECU 10, and outputs the signal to the vehicle control ECU 11.

Figure 4:
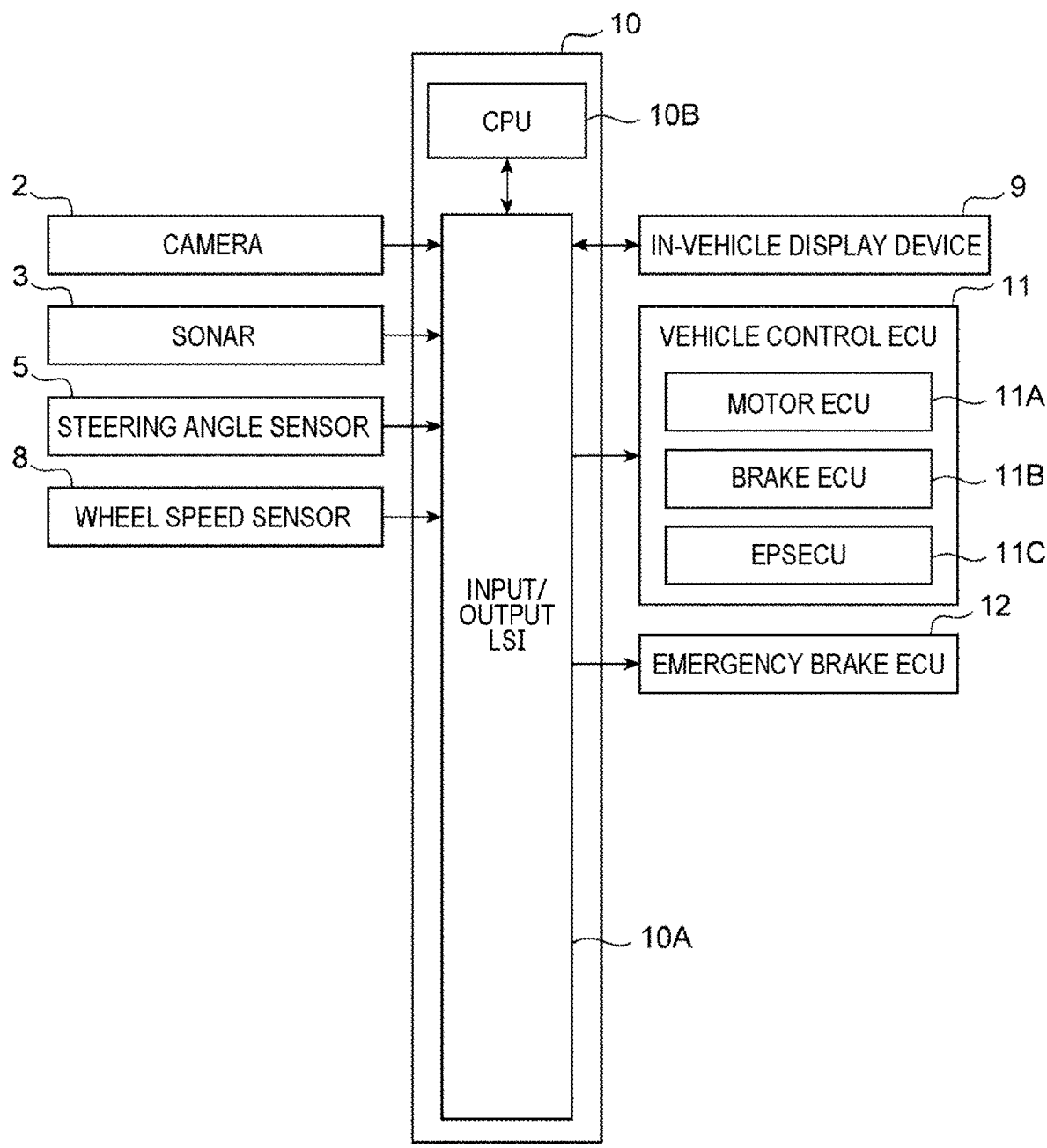
FIG. 4 is a diagram illustrating an internal configuration of a parking assistance ECU illustrated in FIG. 1.

FIG. 4 is a diagram illustrating an internal configuration of the parking assistance ECU 10 illustrated in FIG. 1. FIG. 4 illustrates an electrical connection relationship between the parking assistance ECU 10 and its peripheral devices.

The parking assistance ECU 10 includes an input/output LSI 10A including an AD converter and a CPU 10B. The camera 2, the sonar 3, the steering angle sensor 5, the wheel speed sensor 8, and the in-vehicle display device 9 are connected to an input side of the parking assistance ECU 10. The in-vehicle display device 9, the emergency brake ECU 12, and the motor ECU 11A, the brake ECU 11B, and the EPS ECU 11C of the vehicle control ECU 11 are connected to an output side of the parking assistance ECU 10.

Figure 5:
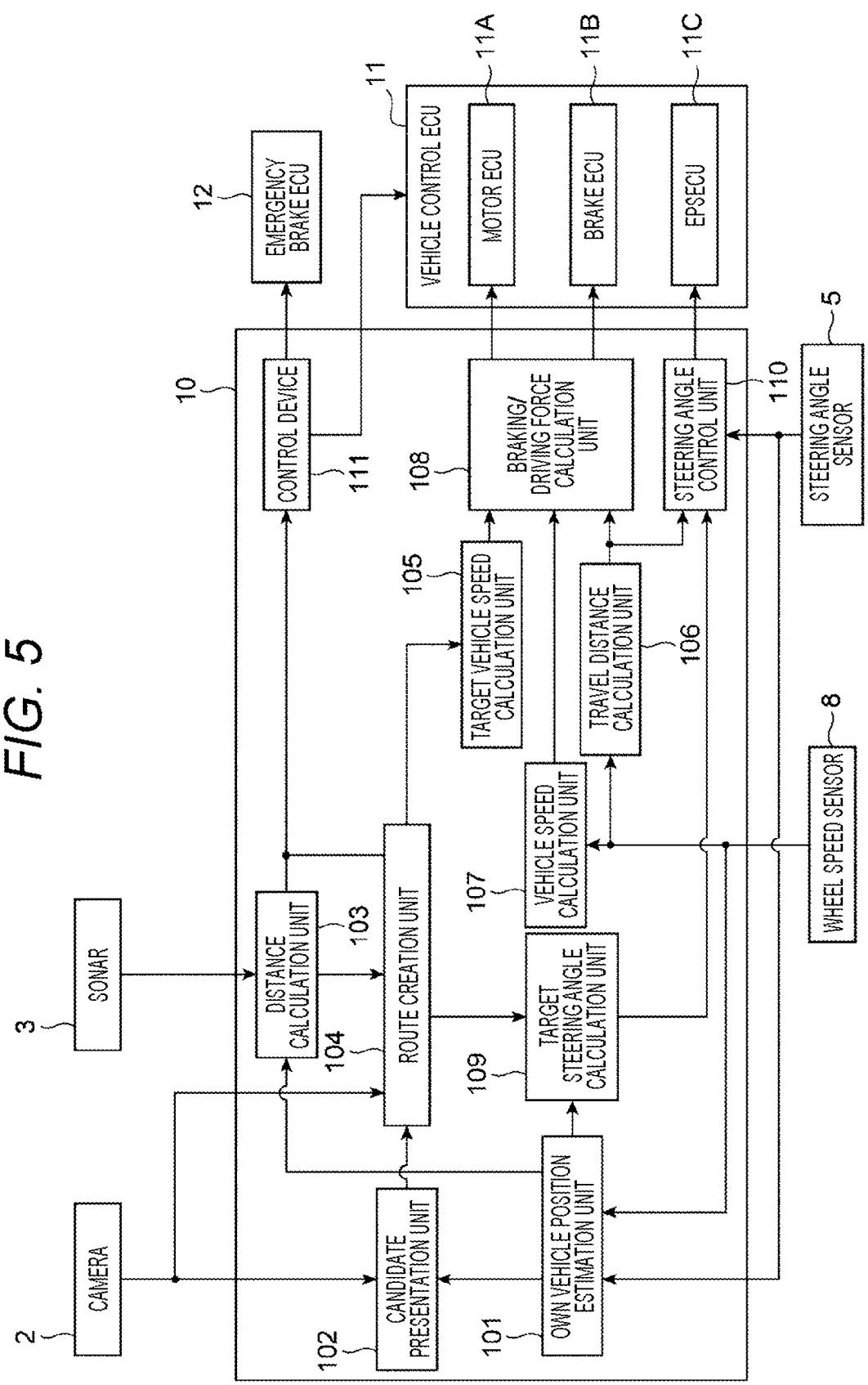
FIG. 5 is a diagram illustrating a functional configuration of the parking assistance ECU illustrated in FIG. 1.
Figure 6:
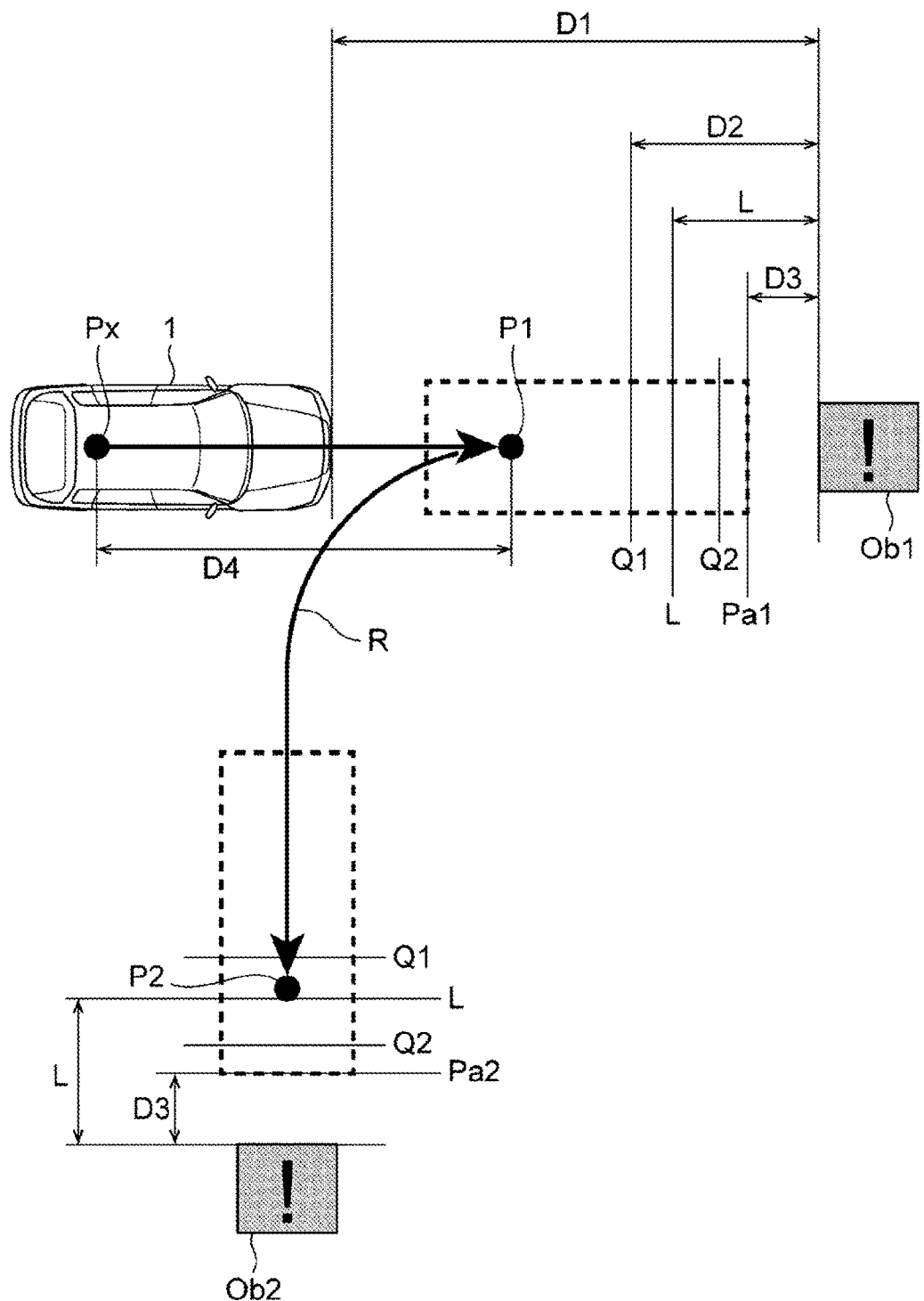
FIG. 6 is a diagram illustrating an example of parking assistance performed by a parking assistance device including the parking assistance ECU illustrated in FIG. 1.

FIG. 5 is a diagram illustrating a functional configuration of the parking assistance ECU 10 illustrated in FIG. 1. Each function illustrated in FIG. 5 is realized by hardware, software, or a combination thereof. FIG. 6 is a diagram for describing an example of parking assistance performed by a parking assistance device including the parking assistance ECU 10 illustrated in FIG. 1.

The parking assistance ECU 10 includes an own vehicle position estimation unit 101, a candidate presentation unit 102, a distance calculation unit 103, a route creation unit 104, a target vehicle speed calculation unit 105, a travel distance calculation unit 106, a vehicle speed calculation unit 107, a braking/driving force calculation unit 108, a target steering angle calculation unit 109, a steering angle control unit 110, and a control device 111.

The own vehicle position estimation unit 101 estimates the current own vehicle position of the vehicle 1 by dead reckoning using the respective detection results of the wheel speed sensor 8 and the steering angle sensor 5. The candidate presentation unit 102 creates a candidate for a target parking position, which is a candidate for a place where the vehicle 1 can be parked, from the own vehicle position of the vehicle 1 and the position of a white line or an obstacle around the own vehicle position acquired by the camera 2, outputs the candidate to the in-vehicle display device 9, and presents the candidate to the driver. When there is a plurality of candidates for the target parking position presented on the in-vehicle display device 9 while the vehicle 1 is stopped, the driver can select the target parking position from the plurality of candidates. The distance calculation unit 103 calculates the distance from the vehicle 1 to the obstacle based on the detection result of the sonar 3. The route creation unit 104 creates a route from the own vehicle position of the vehicle 1 to the target parking position selected by the driver. At this time, the route creation unit 104 determines a target switching position when it is necessary to perform the steering wheel turn-back to stop for switching between the forward travel and the backward travel until the vehicle 1 is parked at the target parking position. The target switching position is a target position at which the vehicle 1 is stopped to perform the steering wheel turn-back until the vehicle 1 is parked at the target parking position in the parking assistance. The route creation unit 104 creates a plurality of target switching positions depending on the positional relationship among the vehicle 1, the obstacle, and the target parking position. In the present embodiment, the target parking position and the target switching position are also collectively referred to as "target vehicle stop position".

The target vehicle speed calculation unit 105 calculates a target vehicle speed based on the route length of the route created by the route creation unit 104 and creates a target vehicle speed profile. The travel distance calculation unit 106 calculates the travel distance of the vehicle 1 from the start of autonomous travel of the vehicle 1 by the parking assistance device on the basis of the detection result of the wheel speed sensor 8. The vehicle speed calculation unit 107 calculates the current vehicle speed of the vehicle 1 based on the detection result of the wheel speed sensor 8. The braking/driving force calculation unit 108 calculates necessary driving force values and braking force values based on the target vehicle speed profile created by the target vehicle speed calculation unit 105, the travel distance calculated by the travel distance calculation unit 106, and the vehicle speed calculated by the vehicle speed calculation unit 107. The braking/driving force calculation unit 108 outputs a signal including the calculated driving force value and braking force value to the motor ECU 11A and the brake ECU 11B of the vehicle control ECU 11. The target steering angle calculation unit 109 calculates a target steering angle based on the route created by the route creation unit 104 and creates a target steering angle profile. The steering angle control unit 110 calculates a necessary steering angle based on the target steering angle profile created by the target steering angle calculation unit 109 and the detection result of the steering angle sensor 5. The steering angle control unit 110 outputs a signal including the calculated steering angle to the EPS ECU 11C of the vehicle control ECU 11.

The control device 111 is a control device of the driving assistance device 200. The control device 111 controls the emergency brake device and the parking assistance device. The control device 111 determines which of the emergency brake device and the parking assistance device is preferentially operated based on the positional relationship among the vehicle 1, the obstacle, and the target vehicle stop position and the detectable range of the sonar 3. The control device 111 constitutes a control device described in the claims.

FIG. 6 illustrates an example in which the vehicle 1 is caused to travel along a route R to assist parking. The route R is a route in which the vehicle 1 travels forward from the current own vehicle position Px of the vehicle 1 toward a target switching position P1, stops at the target switching position P1, and travels backward from the target switching position P1 toward a target parking position P2. In the example of FIG. 6, an obstacle Ob1 exists ahead in a direction from the current own vehicle position Px of the vehicle 1 toward the target switching position P1, and an obstacle Ob2 exists ahead in a direction from the vehicle 1 stopped at the target switching position P1 toward the target parking position P2.

Here, the target switching position P1 and the target parking position P2 are also collectively referred to as a target vehicle stop position P. The obstacle Ob1 and the obstacle Ob2 are also collectively referred to as an obstacle Ob. The obstacle Gb is an obstacle located ahead in the traveling direction of the vehicle 1 during parking assistance. At the target vehicle stop position P located ahead in the traveling direction of the vehicle 1, the position of the part of the vehicle 1 closest to the obstacle Gb located ahead in the traveling direction is Pa. At the start of the operation of the emergency brake device, the position of the part of the vehicle 1 closest to the obstacle Ob located ahead in the traveling direction is Q1. At the stop position of the emergency brake device, the position of the part of the vehicle 1 closest to the obstacle Ob located ahead in the traveling direction is Q2. A distance between the vehicle 1 at the current own vehicle position Px and the obstacle Ob located ahead in the traveling direction of the vehicle 1 is defined as D1. A distance between the vehicle 1 and the obstacle Gb at the start of operation of the emergency brake device is defined as D2. A distance between the vehicle 1 at the target vehicle stop position P located ahead in the traveling direction of the vehicle 1 and the obstacle Gb located ahead in the traveling direction of the vehicle 1 is defined as D3. That is, the distance D3 corresponds to the distance between the position Pa of the part of the vehicle 1 and the obstacle Gb located ahead in the traveling direction of the vehicle 1 when the vehicle 1 stops at the target vehicle stop position P. A distance between the current own vehicle position Px of the vehicle 1 and the target vehicle stop position P located ahead in the traveling direction of the vehicle 1 is defined as D4. In the present embodiment, it is assumed that the distance D1 between the vehicle 1 and the obstacle Ob is larger than the distance D4 between the own vehicle position Px and the target vehicle stop position P.

In FIG. 6, when the vehicle 1 travels forward toward the target switching position P1, the distance D1 is a distance between the vehicle 1 and the obstacle Ob1, and the distance D2 is a distance between the vehicle 1 and the obstacle Ob1 at the start of operation of the emergency brake device. In FIG. 6, in this situation, the distance D3 is a distance between the vehicle 1 and the obstacle Ob1 at the target switching position P1, and the distance D4 is a distance between the own vehicle position Px and the target switching position P1. Further, in FIG. 6, in a situation where the vehicle 1 travels backward from the target switching position P1 toward the target parking position P2 after turning back the steering wheel, the distance D1 is a distance between the vehicle 1 and the obstacle Ob2, and the distance D2 is a distance between the vehicle 1 and the obstacle Ob2 at the start of operation of the emergency brake device. In FIG. 6, in this situation, the distance D3 is a distance between the vehicle 1 and the obstacle Ob2 at the target parking position P2, and the distance D4 is a distance between the own vehicle position Px and the target parking position P2.

In a situation where the vehicle 1 travels forward toward the target switching position P1, if the vehicle 1 approaches the obstacle Ob1 too close beyond the lower limit value L of the detectable range, the ultrasonic wave transmitted from the sonar 3 and the reflected wave from the obstacle Ob1 strongly interfere with each other, and the detection accuracy of the sonar 3 decreases. When the vehicle 1 is too close to the obstacle Ob1 beyond the lower limit value L of the detectable range, it is difficult to accurately calculate the distance D1 between the vehicle 1 and the obstacle Ob1. If the distance D1 between the vehicle 1 and the obstacle Ob1 cannot be accurately calculated, there is a possibility that the emergency brake device cannot be operated at a timing necessary for stopping without colliding with the obstacle Ob1. The driving assistance device 200 needs to start the operation of the emergency brake device at a position farther from the obstacle Ob1 than the lower limit value L of the detectable range, which is the range of the distance in which the distance D1 between the vehicle 1 and the obstacle Ob1 can be accurately calculated. That is, the driving assistance device 200 needs to make the distance D2 between the vehicle 1 and the obstacle Ob1 at the start of the operation of the emergency brake device larger than the lower limit value L of the detectable range.

Since the vehicle speed during parking assistance is low, the braking distance is short. Therefore, when the distance D2 between the vehicle 1 and the obstacle Ob1 at the start of the operation of the emergency brake device is larger than the lower limit value L of the detectable range, the stop position of the vehicle 1 in the emergency brake device tends to be a position farther away from the obstacle Ob1 than the target switching position P1. That is, in this case, the vehicle 1 travels toward the target switching position P1 in the parking assistance, but easily stops by the operation of the emergency brake device before reaching the target switching position P1. As a result, in the vehicle 1, since the parking assistance is interrupted or the number of times of turning back of a steering wheel until the vehicle 1 is parked at the target parking position P2 increases, it takes a lot of time to complete the parking at the target parking position P2, and the convenience of the parking assistance decreases.

In order to prevent the vehicle 1 from stopping before reaching the target switching position P1, it is also conceivable to invalidate the operation of the emergency brake device from the stage of starting the operation of the parking assistance device. However, from the viewpoint of preventive safety, it is desirable to maintain the function of the emergency braking as much as possible. Therefore, the control device 111 of the driving assistance device 200 invalidates the operation of the emergency brake device when the distance D3 between the vehicle 1 and the obstacle Ob1 at the target switching position P1 is smaller than the lower limit value L of the detectable range. Specifically, in this case, control device 111 outputs a signal to invalidate the operation of the emergency brake device to invalidation unit 125 of emergency brake ECU 12. The invalidation unit 125 of the emergency brake ECU 12 generates a signal for temporarily invalidating the operation of the brake by the emergency braking function based on the signal output from control device 111, and outputs the signal to vehicle control ECU 11. The same applies to the situation where the vehicle 1 travels backward from the target switching position P1 toward the target parking position P2 after turning back the steering wheel, and when the distance D3 between the vehicle 1 and the obstacle Ob2 at the target parking position P2 is smaller than the lower limit value L of the detectable range, the control device 111 invalidates the operation of the emergency brake device.

As a result, the control device 111 of the driving assistance device 200 can prevent the vehicle 1 from stopping due to the operation of the emergency brake device before reaching the target vehicle stop position P during the parking assistance while keeping the period in which the operation of the emergency brake device is effective as long as possible. Therefore, the driving assistance device 200 can improve the convenience of the parking assistance while ensuring the preventive safety as much as possible.

Figure 7:
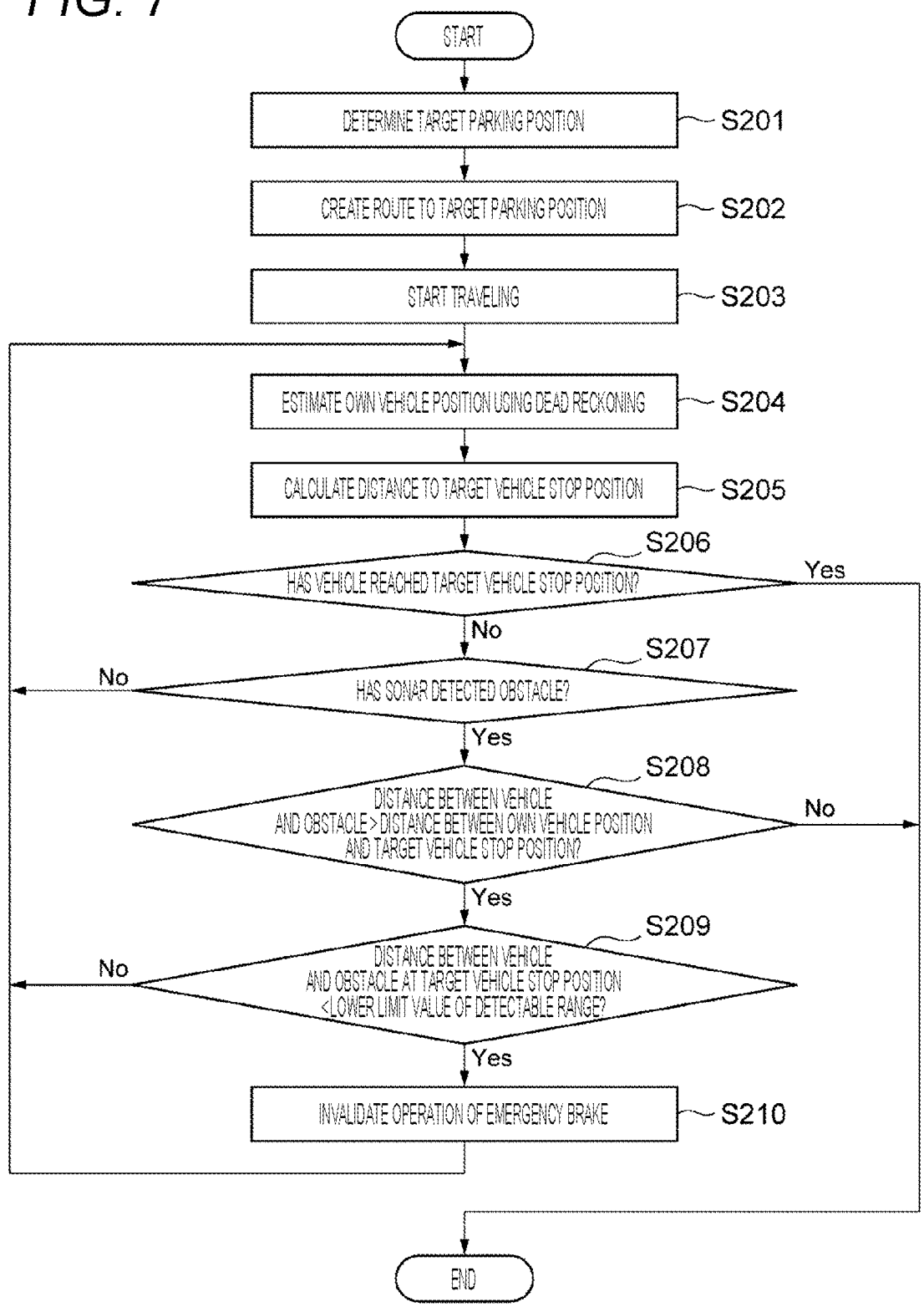
FIG. 7 is a flowchart of processing related to parking assistance according to the first embodiment.

FIG. 7 is a flowchart of processing related to parking assistance according to the first embodiment. When the start of the operation of the parking assistance device is requested by the input operation of the driver to the in-vehicle display device 9 or the like, the driving assistance device 200 performs steps S201 to S210.

In step S201, the driving assistance device 200 creates a candidate for a target parking position, which is a candidate for a place where the vehicle 1 can be parked, using the candidate presentation unit 102, presents the candidate to the driver, and determines the target parking position.

In step S202, the driving assistance device 200 uses the route creation unit 104 to create a travel route of the vehicle 1 in the parking assistance, that is, a route from the current own vehicle position of the vehicle 1 to the target parking position. At this time, the driving assistance device 200 determines the target switching position if the steering wheel turn-back is required.

In step S203, the driving assistance device 200 starts traveling of the vehicle 1 using the control device 111. The driving assistance device 200 causes the vehicle 1 to travel along the created route.

In step S204, the driving assistance device 200 uses the own vehicle position estimation unit 101 to estimate the own vehicle position of the vehicle 1 using dead reckoning for each control cycle of processing related to parking assistance.

In step S205, the driving assistance device 200 calculates the distance from the current own vehicle position of the vehicle 1 to the target vehicle stop position using the distance calculation unit 103. When the target switching position is on the route created in step S202 and the vehicle 1 is traveling toward the target switching position, the driving assistance device 200 calculates the distance from the own vehicle position of the vehicle 1 to the target switching position. The driving assistance device 200 calculates the distance from the own vehicle position of the vehicle 1 to the target parking position when the vehicle 1 is traveling toward the target parking position due to absence of the target switching position on the route or after turning back of a steering wheel.

In step S206, the driving assistance device 200 uses the control device 111 to determine whether the vehicle 1 has reached the target parking position. When the vehicle 1 reaches the target parking position, the driving assistance device 200 ends the processing illustrated in FIG. 7 so as to end the parking assistance. When the vehicle 1 has not reached the target parking position, the driving assistance device 200 proceeds to step S207.

In step S207, the driving assistance device 200 uses the control device 111 to determine whether the sonar 3 has detected an obstacle from the previous control cycle to the current control cycle. When the sonar 3 does not detect an obstacle, the driving assistance device 200 proceeds to step S204. When the sonar 3 detects an obstacle, the driving assistance device 200 proceeds to step S208.

In step S208, the driving assistance device 200 uses the control device Ill to determine whether the distance (D1) between the vehicle 1 and the obstacle is larger than the distance (D4) between the own vehicle position and the target vehicle stop position. In a case where the sonar 3 detects an obstacle after creating a route in step S202 or in a case where a malfunction occurs in the parking assistance ECU 10 or the like, it is conceivable that the distance (D1) between the vehicle 1 and the obstacle is equal to or less than the distance (D4) between the own vehicle position and the target vehicle stop position. In such a case, there is a possibility that the vehicle 1 collides with an obstacle before reaching the target vehicle stop position. Therefore, when the distance (D1) between the vehicle 1 and the obstacle is equal to or less than the distance (D4) between the own vehicle position and the target vehicle stop position, the driving assistance device 200 ends the processing illustrated in FIG. 7 in order to preferentially operate the emergency brake device over the parking assistance device. On the other hand, when the distance (D1) between the vehicle 1 and the obstacle is larger than the distance (D4) between the own vehicle position and the target vehicle stop position, the driving assistance device 200 proceeds to step S209.

In step S209, the driving assistance device 200 uses the control device 111 to determine whether the distance (D3) between the vehicle 1 and the obstacle at the target vehicle stop position is smaller than the lower limit value (L) of the detectable range. When the distance (D3) between the vehicle 1 and the obstacle at the target vehicle stop position is equal to or larger than the lower limit value (L) of the detectable range, the driving assistance device 200 proceeds to step S204. When the distance (D3) between the vehicle 1 and the obstacle at the target vehicle stop position is smaller than the lower limit value (L) of the detectable range, the driving assistance device 200 proceeds to step S210.

In step S210, the driving assistance device 200 temporarily invalidates the operation of the emergency brake device using the control device 111. The period during which the driving assistance device 200 temporarily invalidates the operation of the emergency brake device may be a period until the vehicle 1 reaches the target switching position or the target parking position. Thereafter, driving assistance device 200 proceeds to step S204.

When the distance (D1) between the vehicle 1 and the obstacle is equal to or less than the distance (D4) between the own vehicle position and the target vehicle stop position in step S208, the driving assistance device 200 can stop the vehicle 1 by the operation of the emergency brake device after ending the processing illustrated in FIG. 7, but it is also possible to stop the vehicle 1 before the operation of the emergency brake device. Thereafter, the driving assistance device 200 may create a route from the stop position of the vehicle 1 to the target parking position again and continue the parking assistance regardless of the presence or absence of the operation of the emergency brake device.

As described above, in the driving assistance device 200 of the first embodiment, the control device 111 is a control device that controls the emergency brake device that performs the emergency braking based on the distance to the obstacle detected by the sonar 3 constituting the detection device mounted on the vehicle 1 and the parking assistance device that performs parking assistance of the vehicle 1. In the driving assistance device 200 of the first embodiment, the upper limit value and the lower limit value that define the range of the distance in which the obstacle can be detected are determined in advance in the sonar 3 constituting the detection device. In the driving assistance device 200 of the first embodiment, the control device 111 invalidates the operation of the emergency brake device when the distance (D3) between the vehicle 1 at the target vehicle stop position and the obstacle located ahead in the traveling direction of the vehicle 1 traveling toward the target vehicle stop position in the parking assistance is smaller than the lower limit value (L) of the detectable range.

As a result, in the driving assistance device 200 of the first embodiment, the control device 111 can preferentially operate the parking assistance device over the emergency brake device in a situation where the vehicle 1 at the target vehicle stop position approaches the obstacle beyond the lower limit value (L) of the detectable range. The control device 111 can keep the period during which the operation of the emergency brake device is effective as long as possible without invalidating the operation of the emergency brake device from the start of the operation of the parking assistance device. In addition, the control device 111 can suppress the vehicle 1 from stopping before reaching the target vehicle stop position due to the operation of the emergency brake device during parking assistance. Therefore, the control device 111 can improve the convenience of the parking assistance while securing the preventive safety as much as possible.

Further, in the driving assistance device 200 of the first embodiment, the control device 111 invalidates the operation of the emergency brake device on the assumption that the distance (D1) between the vehicle 1 and the obstacle is larger than the distance (D4) between the own vehicle position and the target vehicle stop position. That is, when the distance (D1) between the vehicle 1 and the obstacle is equal to or less than the distance (D4) between the own vehicle position and the target vehicle stop position, the control device 111 can preferentially operate the emergency brake device over the parking assistance device.

As a result, in the driving assistance device 200 of the first embodiment, the control device 111 can improve the convenience of the parking assistance while reducing the risk that the vehicle 1 collides with the obstacle located before the target vehicle stop position as much as possible. Therefore, the control device 111 can improve the convenience of the parking assistance while further improving the preventive safety.

Second Embodiment

A driving assistance device 200 according to a second embodiment will be described with reference to FIG. 8. In the description of the second embodiment, the description of the same configuration and operation as those of the first embodiment will be omitted.

In the driving assistance device 200 of the first embodiment, when the distance (D3) between the vehicle 1 and the obstacle at the target vehicle stop position is smaller than the lower limit value (L) of the detectable range, the operation of the emergency brake device is invalidated. In the driving assistance device 200 according to the second embodiment, when the distance (D3) between the vehicle 1 and the obstacle at the target vehicle stop position is smaller than the lower limit value (L) of the detectable range and larger than a predetermined value, the operation of the emergency brake device is invalidated.

The predetermined value is a value determined based on at least one of the driving accuracy of the actuator in the traveling device of the vehicle 1 controlled by the vehicle control ECU 11, the estimation accuracy of the own vehicle position by the own vehicle position estimation unit 101, and the detection accuracy of the obstacle by the sonar 3. Specifically, the predetermined value may be the maximum value of the error range of the distance to the obstacle based on the detection accuracy of the sonar 3. Further, the predetermined value may be the maximum value of the error range of the own vehicle position based on the estimation accuracy of the own vehicle position estimation unit 101. In addition, the predetermined value may be the sum of the maximum value of the error range of the distance to the obstacle based on the detection accuracy of the sonar 3 and the maximum value of the error range of the own vehicle position based on the estimation accuracy of the own vehicle position estimation unit 101. When the distance (D3) between the vehicle 1 and the obstacle at the target vehicle stop position is equal to or less than a predetermined value, the distance (D1) between the vehicle 1 and the obstacle cannot be accurately calculated near the target vehicle stop position, and there is a possibility that the emergency brake device cannot be appropriately operated, and there is a possibility that the vehicle 1 collides with the obstacle. Therefore, in the driving assistance device 200 of the second embodiment, the operation of the emergency brake device is invalidated when the distance (D3) between the vehicle 1 and the obstacle at the target vehicle stop position is larger than a predetermined value.

Figure 8:
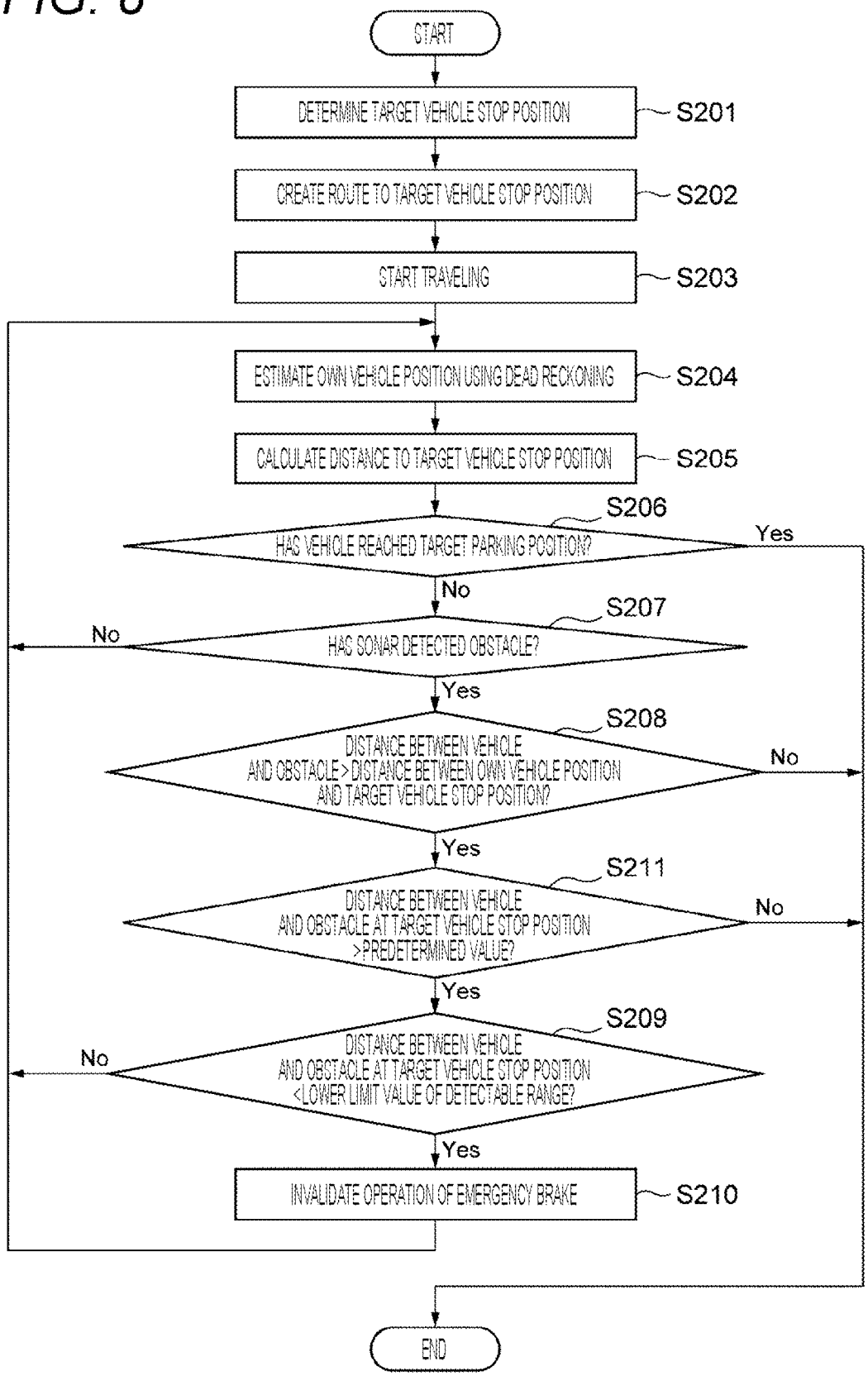
FIG. 8 is a flowchart of processing related to parking assistance according to a second embodiment.

FIG. 8 is a flowchart of processing related to parking assistance according to the second embodiment. FIG. 8 corresponds to FIG. 7.

In steps S201 to S210, the driving assistance device 200 of the second embodiment performs processes similar to those in steps S201 to S210 illustrated in FIG. 7. However, the driving assistance device 200 of the second embodiment performs step S211 between step S208 and step S209. In step S208, when the distance (D1) between the vehicle 1 and the obstacle is larger than the distance (D4) between the own vehicle position and the target vehicle stop position, the driving assistance device 200 according to the second embodiment proceeds to step S211.

In step 3211, the driving assistance device 200 according to the second embodiment uses the control device 111 to determine whether the distance (D3) between the vehicle 1 and the obstacle at the target vehicle stop position is larger than a predetermined value. When the distance (D3) between the vehicle 1 and the obstacle at the target vehicle stop position is equal to or less than a predetermined value, the driving assistance device 200 of the second embodiment ends the process illustrated in FIG. 8 in order to preferentially operate the emergency brake device over the parking assistance device. On the other hand, when the distance (D3) between the target vehicle stop position and the obstacle is larger than the predetermined value, the driving assistance device 200 of the second embodiment proceeds to step S209. In this case, when the determination condition of step S209 is satisfied, the operation of the emergency brake device is invalidated in the driving assistance device 200 of the second embodiment.

As described above, in the driving assistance device 200 according to the second embodiment, the control device 111 invalidates the operation of the emergency brake device when the distance (D3) between the vehicle 1 and the obstacle at the target vehicle stop position is larger than a predetermined value. Specifically, the control device 111 invalidates the emergency brake device when the distance (D3) between the vehicle 1 and the obstacle at the target vehicle stop position is larger than the maximum value of the error range of the distance to the obstacle based on the detection accuracy of the sonar 3. That is, when the distance (D3) between the vehicle 1 and the obstacle at the target vehicle stop position is equal to or less than the maximum value of the error range of the distance to the obstacle based on the detection accuracy of the sonar 3, the control device 111 can preferentially operate the emergency brake device over the parking assistance device.

As a result, in the driving assistance device 200 according to the second embodiment, the control device 111 can improve the convenience of the parking assistance while reducing the risk of the vehicle 1 colliding with the obstacle as much as possible even if the distance to the obstacle detected by the sonar 3 includes an error. Therefore, the control device 111 can improve the convenience of the parking assistance while further improving the preventive safety.

Similarly, in the driving assistance device 200 according to the second embodiment, the control device 111 invalidates the operation of the emergency brake device when the distance (D3) between the vehicle 1 and the obstacle at the target vehicle stop position is larger than the maximum value of the error range of the own vehicle position based on the estimation accuracy of the own vehicle position estimation unit 101. That is, when the distance (D3) between the vehicle 1 and the obstacle at the target vehicle stop position is equal to or less than the maximum value of the error range of the own vehicle position based on the estimation accuracy of the own vehicle position estimation unit 101, the control device 111 can preferentially operate the emergency brake device over the parking assistance device.

As a result, in the driving assistance device 200 of the second embodiment, the control device 111 can improve the convenience of the parking assistance while reducing the risk that the vehicle 1 collides with the obstacle as much as possible even if an error is included in the own vehicle position of the vehicle 1 estimated by the own vehicle position estimation unit 101. Therefore, the control device 111 can improve the convenience of the parking assistance while further improving the preventive safety.

Similarly, in the driving assistance device 200 according to the second embodiment, the control device 111 invalidates the operation of the emergency brake device when the distance (D3) between the vehicle 1 and the obstacle at the target vehicle stop position is larger than the sum of the maximum value of the error range of the distance to the obstacle based on the detection accuracy of the sonar 3 and the maximum value of the error range of the own vehicle position based on the estimation accuracy of the own vehicle position estimation unit 101. That is, when the distance (D3) between the vehicle 1 and the obstacle at the target vehicle stop position is equal to or less than the sum of the maximum value of the error range of the distance to the obstacle based on the detection accuracy of the sonar 3 and the maximum value of the error range of the own vehicle position based on the estimation accuracy of the own vehicle position estimation unit 101, the control device 111 can preferentially operate the emergency brake device over the parking assistance device.

As a result, in the driving assistance device 200 according to the second embodiment, the control device 111 can improve the convenience of the parking assistance while reducing the risk of the vehicle 1 colliding with the obstacle as much as possible even if an error is included in both the own vehicle position of the vehicle 1 and the distance to the obstacle. Therefore, the control device 111 can improve the convenience of the parking assistance while further improving the preventive safety.

Third Embodiment

A driving assistance device 200 according to a third embodiment will be described with reference to FIG. 9. In the description of the third embodiment, the description of the same configuration and operation as those of the first embodiment will be omitted.

In the driving assistance device 200 of the first embodiment, the parking assistance is continued after the operation of the emergency brake device is invalidated. In the driving assistance device 200 of the third embodiment, the operation of the parking assistance device is stopped when an event affecting the estimation accuracy of the own vehicle position by the own vehicle position estimation unit 101 has occurred after the operation of the emergency brake device is invalidated.

The event affecting the estimation accuracy of the own vehicle position by the own vehicle position estimation unit 101 is at least one of a case where the vehicle 1 goes over a step, a case where the vehicle 1 slips, and a case where the vehicle 1 suddenly turns. When an own vehicle position of the vehicle 1 is estimated by dead reckoning using the wheel speed sensor 8, these events deteriorate estimation accuracy of the own vehicle position. That is, when these events occur, the own vehicle position of the vehicle 1 estimated by the own vehicle position estimation unit 101 may include a large error. If the parking assistance is continued even after these events occur, the error included in the own vehicle position of the vehicle 1 increases, and there is a possibility that the emergency brake device cannot be appropriately operated, and there is a possibility that the vehicle 1 collides with an obstacle. Therefore, in the driving assistance device 200 of the third embodiment, when these events occur, the operation of the parking assistance device is stopped.

Figure 9:
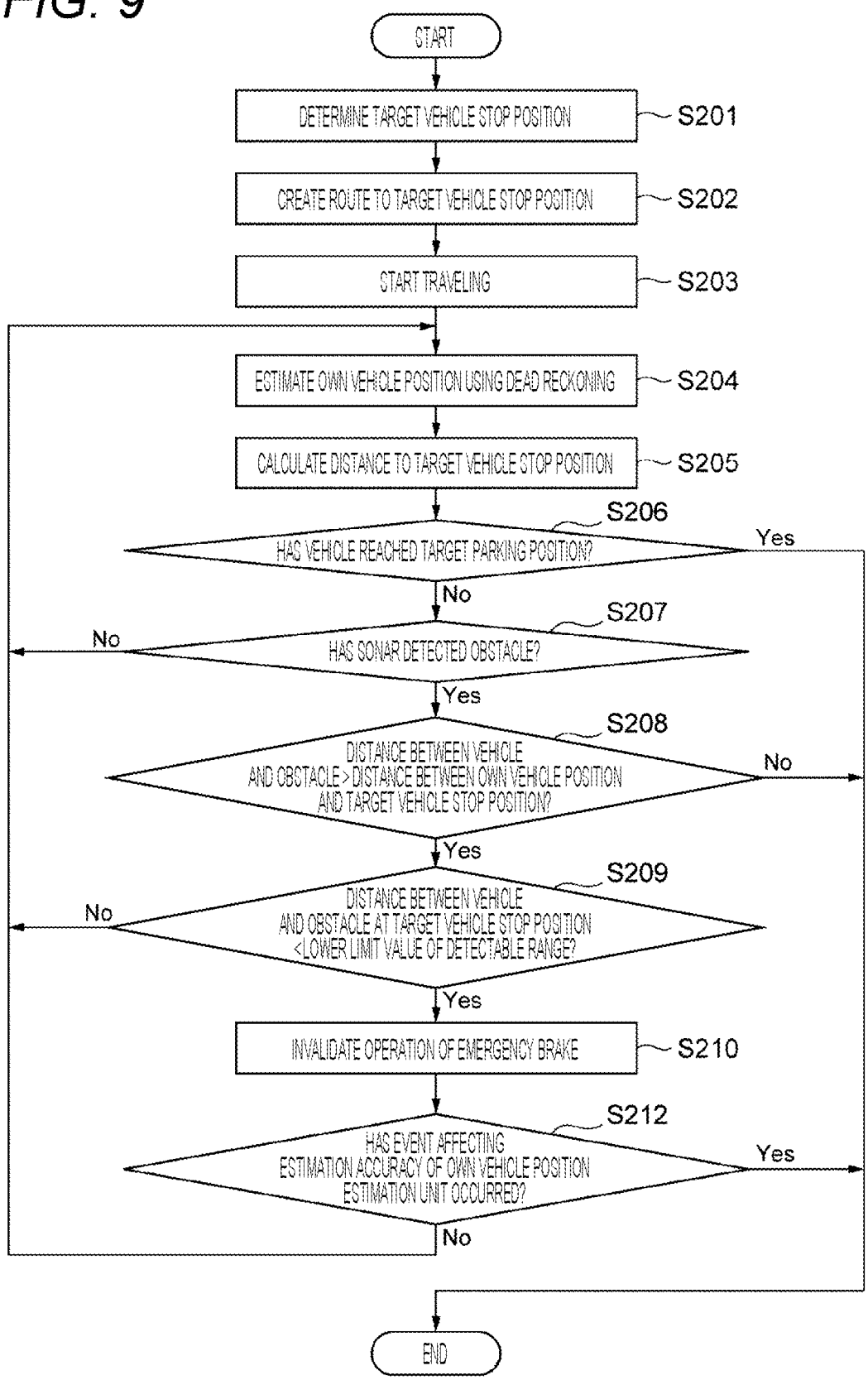
FIG. 9 is a flowchart of processing related to parking assistance according to a third embodiment.

FIG. 9 is a flowchart of processing related to parking assistance according to the third embodiment. FIG. 9 corresponds to FIG. 7.

In steps S201 to S210, the driving assistance device 200 according to the third embodiment performs processes similar to those in steps S201 to S210 illustrated in FIG. 7. However, the driving assistance device 200 of the third embodiment proceeds to step S212 after step S210.

In step S212, the driving assistance device 200 of the third embodiment determines whether an event affecting the estimation accuracy of the own vehicle position by the own vehicle position estimation unit 101 has occurred using the control device 111. When an event affecting the estimation accuracy of the own vehicle position by the own vehicle position estimation unit 101 has occurred, the driving assistance device 200 of the third embodiment stops the operation of the parking assistance device and ends the processing illustrated in FIG. 9 in order to preferentially operate the emergency brake device. On the other hand, in a case where an event affecting the estimation accuracy of the own vehicle position by the own vehicle position estimation unit 101 has not occurred, the driving assistance device 200 of the third embodiment proceeds to step S204.

As described above, in the driving assistance device 200 of the third embodiment, the control device 111 stops the operation of the parking assistance device when an event affecting the estimation accuracy of the own vehicle position by the own vehicle position estimation unit 101 has occurred after invalidating the operation of the emergency brake device.

As a result, in the driving assistance device 200 of the third embodiment, the control device 111 can improve the convenience of the parking assistance while reducing the risk of the vehicle 1 colliding with the obstacle before reaching the target vehicle stop position as much as possible. Therefore, the control device 111 can improve the convenience of the parking assistance while further improving the preventive safety.

Fourth Embodiment

A driving assistance device 200 according to a fourth embodiment will be described with reference to FIG. 10. In the description of the fourth embodiment, the description of the same configuration and operation as those of the first embodiment will be omitted.

In the driving assistance device 200 of the first embodiment, the operation of the emergency brake device is invalidated without particularly considering the type of the obstacle detected by the sonar 3. In the driving assistance device 200 of the fourth embodiment, when the obstacle is a stationary object, the operation of the emergency brake device is invalidated.

The stationary object is an object which is stationary such as a sign. The driving assistance device 200 according to the fourth embodiment can extract features such as the outer shape of the detected obstacle based on the detection result of the sonar 3 and the image acquired by the camera 2, and calculate the probability that the detected obstacle is a stationary object. The driving assistance device 200 of the fourth embodiment compares the calculated probability with a predetermined threshold. When the calculated probability is less than the threshold, the driving assistance device 200 according to the fourth embodiment determines that there is a high possibility that the obstacle is not a stationary object but a moving object. When there is a high possibility that the obstacle is a moving object, there is a high possibility that the vehicle 1 collides with the obstacle. Therefore, in the driving assistance device 200 of the fourth embodiment, when the obstacle is a stationary object, the operation of the emergency brake device is invalidated, but when the obstacle is a moving object, the emergency brake device is preferentially operated over the parking assistance device.

Figure 10:
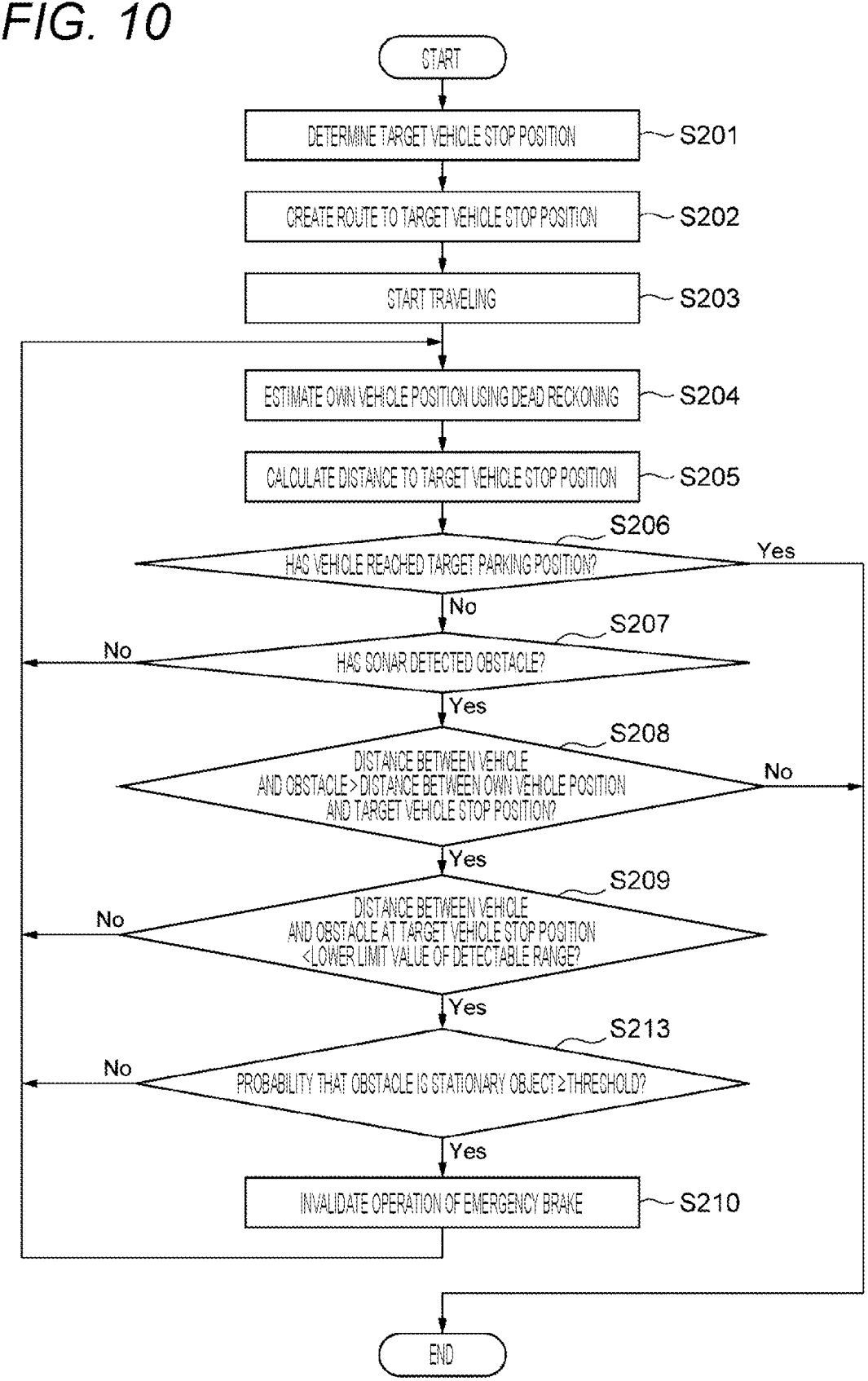
FIG. 10 is a flowchart of processing related to parking assistance according to a fourth embodiment.

FIG. 10 is a flowchart of processing related to parking assistance according to the fourth embodiment. FIG. 10 corresponds to FIG. 7.

In steps S201 to S210, the driving assistance device 200 according to the fourth embodiment performs processes similar to those in steps S201 to S210 illustrated in FIG. 7. However, the driving assistance device 200 of the fourth embodiment performs step S213 between step S209 and step S210. In step S209, when the distance (D3) between the vehicle 1 and the obstacle at the target vehicle stop position is smaller than the lower limit value (L) of the detectable range, the driving assistance device 200 according to the fourth embodiment proceeds to step S213.

In step S213, the driving assistance device 200 according to the fourth embodiment uses the control device 111 to determine whether the probability that the obstacle is a stationary object is equal to or greater than a threshold. In a case where the calculated probability is less than the threshold, there is a high possibility that the obstacle is a moving object. Therefore, the driving assistance device 200 according to the fourth embodiment proceeds to step S204 in order to continue parking assistance without invalidating the operation of the emergency brake device. On the other hand, when the calculated probability is equal to or greater than the threshold, there is a high possibility that the obstacle is a stationary object, and thus the driving assistance device 200 of the fourth embodiment proceeds to step S210. In this case, in the driving assistance device 200 of the fourth embodiment, the control device 111 can temporarily invalidate the operation of the emergency brake device, and can preferentially operate the parking assistance device over the emergency brake device.

As described above, in the driving assistance device 200 according to the fourth embodiment, the control device 111 invalidates the operation of the emergency brake device when the obstacle is a stationary object. That is, when the obstacle is not a stationary object, the control device 111 can preferentially operate the emergency brake device over the parking assistance device.

As a result, in the driving assistance device 200 of the fourth embodiment, the control device 111 can temporarily invalidate the operation of the emergency brake device only when the obstacle near the target vehicle stop position is a stationary object. The control device 111 can improve the convenience of the parking assistance while reducing the risk that the obstacle moves and collides as much as possible after the parking assistance device is operated with priority over the emergency brake device. Therefore, the control device 111 can improve the convenience of the parking assistance while further improving the preventive safety.

In the driving assistance device 200 according to the fourth embodiment, the control device 111 may determine whether there is an obstacle that has not moved so far since the start of the operation of the parking assistance device, instead of determining whether the probability that the obstacle is a stationary object is equal to or greater than a threshold. In this case, the control device 111 may determine an obstacle that has not moved so far since the start of the operation of the parking assistance device as a stationary object.

Fifth Embodiment

A driving assistance device 200 according to a fifth embodiment will be described with reference to FIG. 11. In the description of the fifth embodiment, the description of the same configuration and operation as those of the first embodiment will be omitted.

In the driving assistance device 200 of the first embodiment, the parking assistance is continued after the operation of the emergency brake device is invalidated. In the driving assistance device 200 of the fifth embodiment, the operation of the parking assistance device is stopped when the sonar 3 detects a moving object after the operation of the emergency brake device is invalidated.

The driving assistance device 200 according to the fifth embodiment can determine whether a moving object has been detected by comparing an image acquired by the camera 2 in the previous control cycle with an image acquired in the current control cycle. When the moving object is detected after the operation of the emergency brake device is invalidated, the possibility that the vehicle 1 collides with the moving object increases. Therefore, in the driving assistance device 200 of the fifth embodiment, when the moving object is detected, the operation of the parking assistance device is stopped to preferentially operate the emergency brake device.

Figure 11:
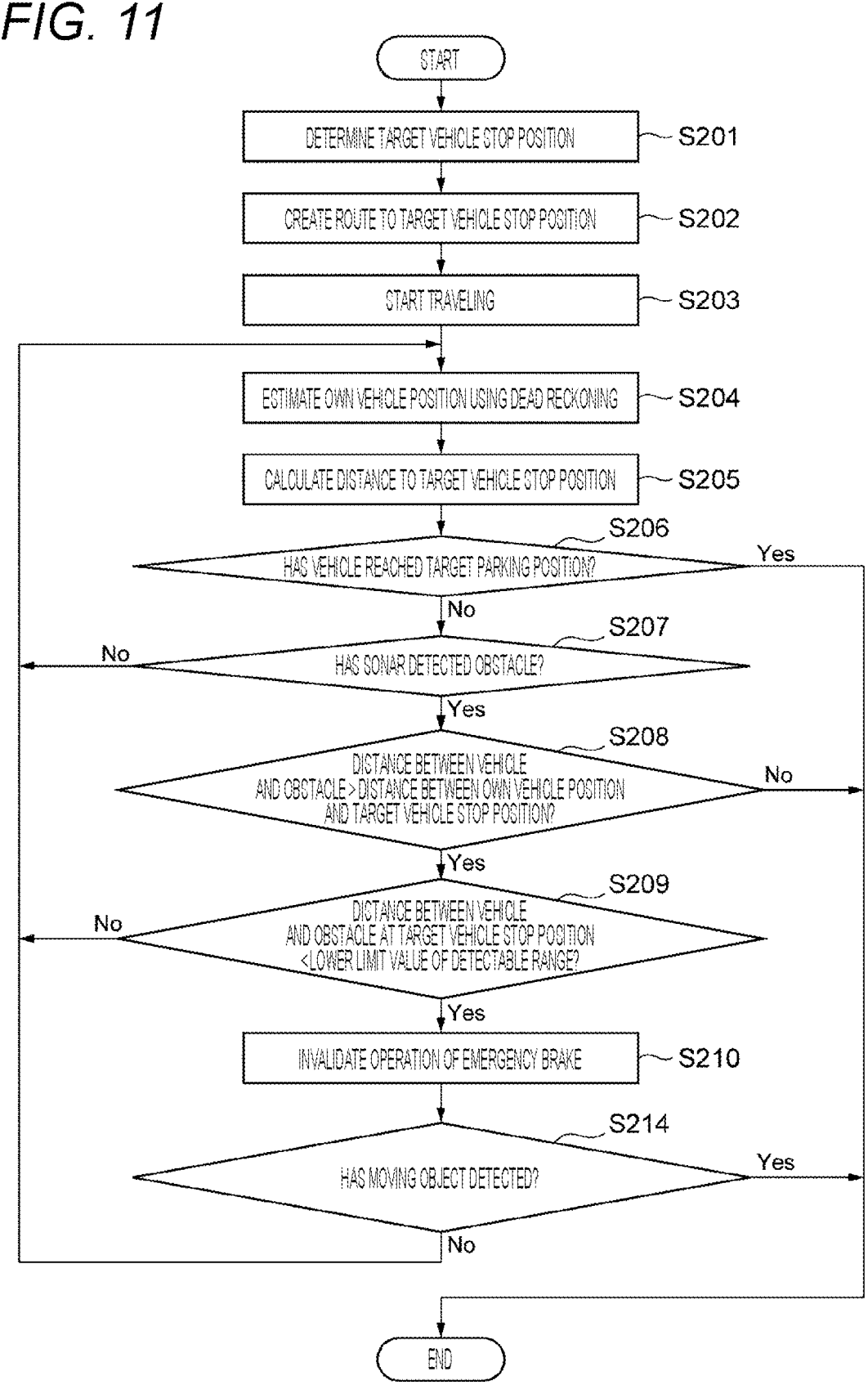
FIG. 11 is a flowchart of processing related to parking assistance according to a fifth embodiment.

FIG. 11 is a flowchart illustrating a flow of processing related to parking assistance according to the fifth embodiment. FIG. 11 corresponds to FIG. 7.

In steps S201 to S210, the driving assistance device 200 of the fifth embodiment performs processes similar to those in steps S201 to S210 illustrated in FIG. 7. However, the driving assistance device 200 of the fifth embodiment proceeds to step S214 after step S210.

In step S214, the driving assistance device 200 according to the fifth embodiment determines whether a moving object has been detected using the control device 111. When detecting the moving object, the driving assistance device 200 of the fifth embodiment ends the processing illustrated in FIG. 11 in order to stop the operation of the parking assistance device and validate the operation of the emergency brake device. On the other hand, in a case where the driving assistance device 200 of the fifth embodiment does not detect a moving object, the process proceeds to step S204.

As described above, in the driving assistance device 200 of the fifth embodiment, the control device 111 stops the operation of the parking assistance device when the moving object is detected after invalidating the operation of the emergency brake device.

As a result, in the driving assistance device 200 of the fifth embodiment, the control device III can improve the convenience of the parking assistance while reducing the risk of collision with the moving object as much as possible after invalidating the operation of the emergency brake device. Therefore, the control device 111 can improve the convenience of the parking assistance while further improving the preventive safety.

In the driving assistance device 200 of the fifth embodiment, the control device 111 may restart the operation of the parking assistance device in a case where it can be determined that the moving object does not move after detecting the moving object and stopping the vehicle 1. In this case, if the moving direction of the moving object is a direction away from the target vehicle stop position, the possibility that the vehicle 1 and the moving object collide is low, and thus the control device 111 does not need to stop the vehicle 1. The sensor that detects the moving object is not limited to the camera 2, and may be another sensor such as a rider.

Sixth Embodiment

A driving assistance device 200 according to a sixth embodiment will be described with reference to FIG. 12. In the description of the sixth embodiment, the description of the same configuration and operation as those of the first embodiment will be omitted.

In the driving assistance device 200 of the first embodiment, the parking assistance is performed without particularly considering the possibility that the parking assistance device has fail ed. in the driving assistance device 200 of the sixth embodiment, when there is a possibility that the parking assistance device has failed, the operation of the parking assistance device is stopped.

In the driving assistance device 200 of the sixth embodiment, when the parking assistance is being performed, the parking assistance ECU 10 of the parking assistance device outputs a signal indicating that parking assistance is being performed to the emergency brake ECU 12 of the emergency brake device. The control device 111 can monitor the signal during parking assistance and determine whether the signal is interrupted. In a case where the signal is interrupted, there is a possibility that the parking assistance ECU 10 has failed, and there is a possibility that the vehicle 1 collides with an obstacle. Therefore, in the driving assistance device 200 of the sixth embodiment, when there is a possibility that the parking assistance device has failed, the operation of the parking assistance device is stopped.

Figure 12:
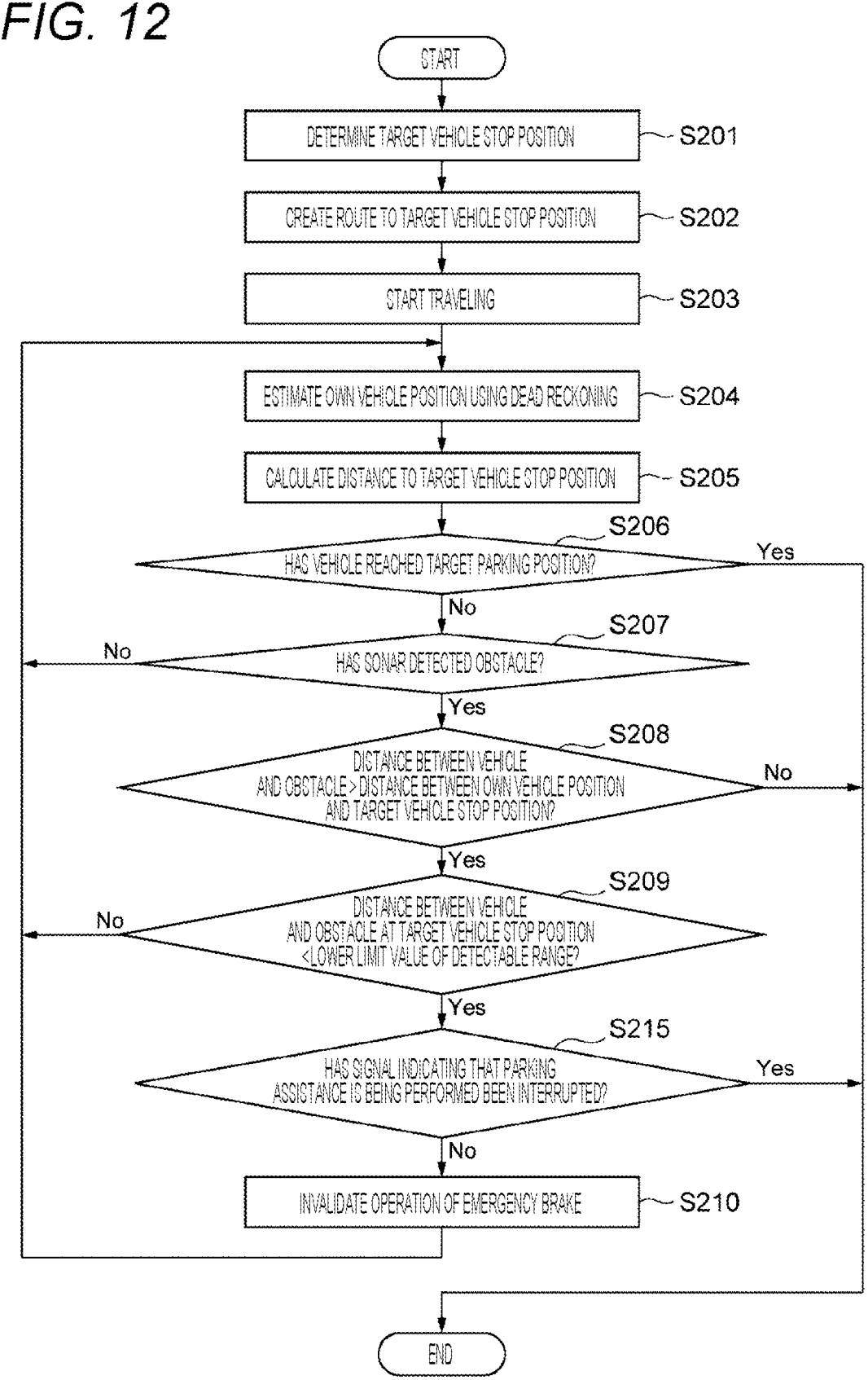
FIG. 12 is a flowchart of processing related to parking assistance according to a sixth embodiment.

FIG. 12 is a flowchart illustrating a flow of processing related to parking assistance according to the sixth embodiment. FIG. 12 corresponds to FIG. 7.

In steps S201 to S210, the driving assistance device 200 according to the sixth embodiment performs processes similar to those insteps S201 to S210 illustrated in FIG. 7. However, the driving assistance device 200 of the sixth embodiment performs step S215 between step S209 and step S210. In a case where the distance (D3) between the vehicle 1 and the obstacle at the target vehicle stop position is smaller than the lower limit value (L) of the detectable range in step S209, the driving assistance device 200 of the sixth embodiment proceeds to step S215.

In step S215, the driving assistance device 200 according to the sixth embodiment uses the control device 111 to determine whether the signal indicating that parking assistance is being performed is interrupted. When the signal indicating that parking assistance is being performed is interrupted, the driving assistance device 200 of the sixth embodiment stops the operation of the parking assistance device and ends the processing illustrated in FIG. 12 in order to preferentially operate the emergency brake device. On the other hand, when the signal indicating that parking assistance is being performed is not interrupted, the driving assistance device 200 according to the sixth embodiment proceeds to step S210.

As described above, in the driving assistance device 200 according to the sixth embodiment, the parking assistance device outputs a signal indicating that parking assistance is being performed to the emergency brake device in a case where parking assistance is being performed, and the control device 111 stops the operation of the parking assistance device in a case where the signal is interrupted.

As a result, in the driving assistance device 200 according to the sixth embodiment, the control device 111 can improve the convenience of the parking assistance while reducing the risk that the vehicle 1 collides with the obstacle as much as possible even if there is a possibility that the parking assistance device has failed in the vicinity of the target vehicle stop position where the detection accuracy of the sonar 3 decreases. Therefore, the control device 111 can improve the convenience of the parking assistance while further improving the preventive safety.

In the above exemplary embodiment, it has been described that the detectable range of the detection device included in driving assistance device 200 is invariable, and the lower limit value (L) of the detectable range is a constant. The detection device included in driving assistance device 200 is not limited to this, and the detectable range may be variable, and the lower limit value (L) of the detectable range may be a variable. In this case, the lower limit value (L) of the detectable range may be a variable determined based on at least one of the air temperature, the air pressure, and the wind speed around the vehicle 1. The air temperature, the air pressure, and the wind speed around the vehicle 1 can be detected by sensors provided in advance in the vehicle 1. The control device 111 may store in advance a table indicating a correspondence relationship between variables such as the air temperature, the air pressure, and the wind speed and the lower limit value (L) of the detectable range, and may set the lower limit value (L) of the detectable range to the detection device by referring to the table when the operation of the parking assistance device starts.

When the detection device is constituted by the sonar 3, the propagation speed of the ultrasonic wave transmitted from the sonar 3 changes according to the temperature, pressure, and the like of the air that is the medium propagating the ultrasonic wave, and thus, it is conceivable that the lower limit value (L) of the detectable range of the sonar 3 also changes. The lower limit value (L) of the detectable range is a criterion for determining which of the emergency brake device and the parking assistance device is preferentially operated. When the lower limit value (L) of the detectable range is a variable determined on the basis of the air temperature or the like, the criterion is a criterion adapted to the change in the surrounding environment of the vehicle 1. As a result, in the driving assistance device 200, the control device 111 can more appropriately determine which of the emergency brake device and the parking assistance device is to be preferentially operated, and thus, it is possible to further improve the convenience of the parking assistance while further reliably securing the preventive safety.

In the above embodiment, the parking assistance of the driving assistance device 200 has been described as assisting at least one of the steering operation, the accelerator operation, the brake operation, and the shift operation of the driver by autonomously operating the EPS device 6, the drive motor, the brake, the shift-by-wire control device, and the like, which are the traveling devices of the vehicle 1. The parking assistance of the driving assistance device 200 is not limited thereto, and may be performed only by displaying a route from the own vehicle position of the vehicle 1 to the target parking position on the in-vehicle display device 9 or by guiding a driving operation necessary for parking by voice or the like.

In the above embodiment, the sonar 3 that transmits an ultrasonic wave has been described as an example of the detection device included in the driving assistance device 200. The detection device included in driving assistance device 200 is not limited thereto. For example, the detection device included in driving assistance device 200 may be another sensor such as a radar or a rider that transmits electromagnetic waves or laser light to detect an obstacle. In the above embodiment, the control device 111 is provided in the parking assistance ECU 10, but may be provided in the vehicle control ECU 11, may be provided in the emergency brake ECU 12, or may be configured by a dedicated ECU. The vehicle 1 may not be a vehicle that travels using a drive motor as a power source, but may be a vehicle that travels using an internal combustion engine as a power source.

[Others]

The present invention is not limited to the above embodiments, and various modifications may be contained. For example, the above-described embodiments of the present invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

Each of the above configurations, functions, processing units, processing means, and the like may be partially or entirely achieved by hardware by, for example, designing by an integrated circuit. In addition, the configurations and the functions may be realized in software such that a processor analyzes and performs a program which realizes each function. Information such as a program, a tape, and a file for realizing each function can be stored in a recording device such as a memory, a hard disk, and a solid state drive (SSD), or a recording medium such as an IC card, an SD card, and a DVD.

In addition, only control lines and information lines considered to be necessary for explanation are illustrated, but not all the control lines and the information lines for a product are illustrated. In practice, almost all the configurations may be considered to be connected to each other.

REFERENCE SIGNS LIST 1 vehicle
3 sonar (detection device)
10 parking assistance ECU
12 emergency brake ECU
111 control device
101 own vehicle position estimation unit
200 driving assistance device

The invention claimed is:

1. A control device for driving assistance, the control device including one or more processors configured to:
   determine an upper limit value and a lower limit value that define a detectable range in which an obstacle is to be detected;
   detect, by a detector mounted on a vehicle, the obstacle; and
   perform an emergency braking operation based on a first distance to the obstacle;
   wherein the one or more processors are configured to, in response to a determination that a second distance is smaller than the lower limit value, invalidate the emergency braking operation based on the second distance, second distance is between the vehicle at a target vehicle stop position and the obstacle located ahead in a traveling direction of the vehicle, further ahead of traveling toward the target vehicle stop position.

2. The control device of claim 1, wherein the one or more processors are configured to invalidate the emergency braking operation in response to a determination that the second distance is larger than a maximum value of an error range of the first distance based on detection accuracy of the detector.

3. The control device of claim 1, wherein the one or more processors are configured to:
   perform a parking assistance operation using an own position of the vehicle; and
   invalidate the emergency braking operation in response to a determination that the second distance is larger than a maximum value of an error range of the own position of the vehicle, based on accuracy of determining the own position of the vehicle.

4. The control device of claim 1, wherein the one or more processors are configured to:
   perform a parking assistance operation using an own position of the vehicle; and
   invalidate the emergency braking operation in response to a determination that the second distance
   is larger than a sum of a maximum value of an error range of the first distance based on detection accuracy of the detector and a maximum value of an error range of the own position of the vehicle based on accuracy of determining the own position of the vehicle.

5. The control device of claim 1, wherein the one or more processors are configured to:
   perform a parking assistance operation using an own position of the vehicle; and
   stop the parking assistance operation in response to a determination that an event that affects accuracy of determining the own position of the vehicle occurs after the emergency braking operation is invalidated.

6. The control device of claim 1, wherein the one or more processors are configured to invalidate the emergency braking operation in response to the obstacle being a stationary object.

7. The control device of claim 1, wherein the one or more processors are configured to:
   stop a parking assistance operation in response to a detection of a moving object after the emergency braking operation is invalidated.

8. The control device of claim 1, wherein the one or more processors are configured to:
   output a signal indicating that a parking assistance operation is being performed; and
   stop the parking assistance operation in response to a determination that the signal is interrupted.

9. The control device of claim 1, wherein the lower limit value is determined based on at least one of an air temperature, an air pressure, and a wind speed.

* * * * *